(12) United States Patent
Porter et al.

(10) Patent No.: US 9,314,956 B2
(45) Date of Patent: *Apr. 19, 2016

(54) BLOW MOLDING METHOD AND APPARATUS FOR FORMING SQUEEZABLE PLASTIC CONTAINER

(71) Applicant: Silgan Plastics LLC, Chesterfield, MO (US)

(72) Inventors: Randal D. Porter, Norcross, GA (US); Daniel M. Futral, Marietta, GA (US); John K. Silva, Suwanee, GA (US); William J. Peek, Lawrenceville, GA (US); Brian J. Benell, Monroe, GA (US); Laura A. Flanagan-Kent, Decatur, GA (US)

(73) Assignee: Silgan Plastics LLC, Chesterfield, MO (US)

( * ) Notice: Subject to any disclaimer, the term of this patent is extended or adjusted under 35 U.S.C. 154(b) by 200 days.

This patent is subject to a terminal disclaimer.

(21) Appl. No.: 14/034,028

(22) Filed: Sep. 23, 2013

(65) Prior Publication Data

US 2014/0021658 A1  Jan. 23, 2014

Related U.S. Application Data

(63) Continuation of application No. 13/226,175, filed on Sep. 6, 2011, now Pat. No. 8,568,634, which is a continuation of application No. PCT/US2011/046140, filed on Aug. 1, 2011.

(60) Provisional application No. 61/400,885, filed on Aug. 4, 2010.

(51) Int. Cl.
*B29C 49/06* (2006.01)
*B29C 49/08* (2006.01)
(Continued)

(52) U.S. Cl.
CPC ............... *B29C 49/08* (2013.01); *B29B 11/14* (2013.01); *B29C 49/06* (2013.01); *B29C 49/50* (2013.01);

(Continued)

(58) Field of Classification Search
None
See application file for complete search history.

(56) References Cited

U.S. PATENT DOCUMENTS 3,161,904 A    12/1964   Goldich
3,195,995 A     7/1965   Rowe
(Continued)

FOREIGN PATENT DOCUMENTS

EP    0677374 A2   10/1995
GB    1390234 A     4/1975
(Continued)

OTHER PUBLICATIONS

International Search Report and Written Opinion regarding International Application No. PCT/US2011/046140, dated Apr. 6, 2012, 9 pages.

(Continued)

*Primary Examiner* — Monica Huson
(74) *Attorney, Agent, or Firm* — Reinhart Boerner Van Deuren s.c.

(57) ABSTRACT

A blow-molding method for forming a squeezable or tubular plastic container is provided. The method includes molding a preform having a sidewall, an interior cavity, an open end, a closed end, and a neck adjacent the closed end of the preform. The neck of the preform has an engagement structure. The method includes providing a blow mold system including a blow mold cavity. The method includes placing at least a portion of the preform into the blow mold cavity, and blow molding a one-piece container body from the preform by inflating the preform within the blow mold cavity. The container body has an open end, a closed end and a neck adjacent to the closed end. Wherein the open end of the container body is formed from the open end of the preform, and the closed end of the container body is formed from the closed end of the preform. The method includes creating a dispensing opening through the closed end of the container body.

10 Claims, 15 Drawing Sheets

(51) Int. Cl.
*B29B 11/14* (2006.01)
*B29C 49/50* (2006.01)
*B65D 35/08* (2006.01)
*B29B 11/08* (2006.01)
*B29C 49/12* (2006.01)
*B29K 23/00* (2006.01)
*B29K 67/00* (2006.01)
*B29K 77/00* (2006.01)

(52) U.S. Cl.
CPC ............ *B65D 35/08* (2013.01); *B29B 11/08* (2013.01); *B29B 2911/1402* (2013.01); *B29B 2911/1404* (2013.01); *B29B 2911/1408* (2013.01); *B29B 2911/1414* (2013.01); *B29B 2911/14026* (2013.01); *B29B 2911/14033* (2013.01); *B29B 2911/1438* (2013.01); *B29B 2911/1446* (2013.01); *B29B 2911/14053* (2013.01); *B29B 2911/14066* (2013.01); *B29B 2911/1482* (2013.01); *B29B 2911/14093* (2013.01); *B29B 2911/14106* (2013.01); *B29B 2911/14113* (2013.01); *B29B 2911/14133* (2013.01); *B29B 2911/14326* (2013.01); *B29B 2911/14333* (2013.01); *B29B 2911/14386* (2013.01); *B29B 2911/14486* (2013.01); *B29B 2911/14826* (2013.01); *B29C 49/12* (2013.01); *B29K 2023/06* (2013.01); *B29K 2023/086* (2013.01); *B29K 2023/12* (2013.01); *B29K 2067/003* (2013.01); *B29K 2077/00* (2013.01); *B65D 2203/00* (2013.01); *B65D 2203/02* (2013.01); *Y10T 428/1352* (2015.01)

(56) References Cited

U.S. PATENT DOCUMENTS

| | | | |
|---|---|---|---|
| 3,597,517 A | 8/1971 | Smith | |
| 3,684,389 A | 8/1972 | Eron et al. | |
| 3,855,380 A | 12/1974 | Gordon et al. | |
| 3,950,468 A | 4/1976 | Rainville | |
| 4,101,618 A | 7/1978 | Aoki | |
| 4,447,199 A | 5/1984 | Reed et al. | |
| 4,509,875 A | 4/1985 | Shintani | |
| D279,992 S | 8/1985 | Gribb | |
| 4,557,618 A | 12/1985 | Iwata et al. | |
| 4,666,063 A | 5/1987 | Holoubek et al. | |
| 4,723,902 A | 2/1988 | Erickson | |
| 4,753,591 A | 6/1988 | Maes et al. | |
| 4,776,494 A | 10/1988 | Holoubek | |
| 4,844,250 A | 7/1989 | Holoubek et al. | |
| 4,844,302 A | 7/1989 | Lay | |
| 4,988,399 A | 1/1991 | Watson et al. | |
| 5,069,856 A | 12/1991 | Holoubek et al. | |
| 5,203,379 A | 4/1993 | Holoubek et al. | |
| 5,238,148 A | 8/1993 | Holoubek et al. | |
| 5,322,658 A | 6/1994 | Holoubek et al. | |
| 5,746,356 A | 5/1998 | Kieras | |
| 5,797,518 A | 8/1998 | Kieras | |
| 5,846,012 A | 12/1998 | Kudo | |
| 5,895,160 A | 4/1999 | Ginelli | |
| 5,911,344 A | 6/1999 | Kieras | |
| 5,918,783 A | 7/1999 | Kieras et al. | |
| D414,688 S | 10/1999 | Loeb et al. | |
| D423,355 S | 4/2000 | Loeb et al. | |
| 6,047,525 A | 4/2000 | Kieras et al. | |
| 6,051,295 A | 4/2000 | Schloss et al. | |
| 6,129,880 A | 10/2000 | Kieras et al. | |
| 6,136,247 A | 10/2000 | Rhoades | |
| 6,165,395 A | 12/2000 | Kieras et al. | |
| 6,179,501 B1 | 1/2001 | Fulop | |
| 6,221,189 B1 | 4/2001 | Kieras et al. | |
| 6,223,541 B1 | 5/2001 | Farrag | |
| 6,241,408 B1 | 6/2001 | Lang | |
| 6,270,578 B1 | 8/2001 | Murakoshi | |
| D449,524 S | 10/2001 | Kieras | |
| 6,334,767 B2 | 1/2002 | Kieras et al. | |
| 6,464,486 B1 | 10/2002 | Barray et al. | |
| 6,474,887 B2 | 11/2002 | Ozu | |
| 6,588,178 B1 | 7/2003 | Kieras | |
| 6,852,267 B1 | 2/2005 | Keller | |
| 7,740,792 B2 | 6/2010 | Haury et al. | |
| 8,568,634 B2 * | 10/2013 | Porter | B29B 11/14 264/154 |
| 2012/0031870 A1 | 2/2012 | Porter et al. | |

FOREIGN PATENT DOCUMENTS

| | | |
|---|---|---|
| GB | 2145027 | 3/1985 |
| IT | 413891 | 4/1941 |
| IT | 448677 | 5/1941 |
| JP | 49-97161 | 9/1974 |
| JP | 51-24476 | 2/1976 |
| JP | 54-27512 | 9/1979 |
| JP | 59-83589 | 6/1984 |
| JP | 09-286200 | 11/1997 |
| JP | 11-222272 | 8/1999 |
| KR | 10-0226882 B1 | 10/1999 |
| KR | 10-2002-008092 A | 1/2002 |

OTHER PUBLICATIONS

European Patent Office, Extended European Search Report, Jan. 26, 2016, 8 pages, Munich Germany.

* cited by examiner

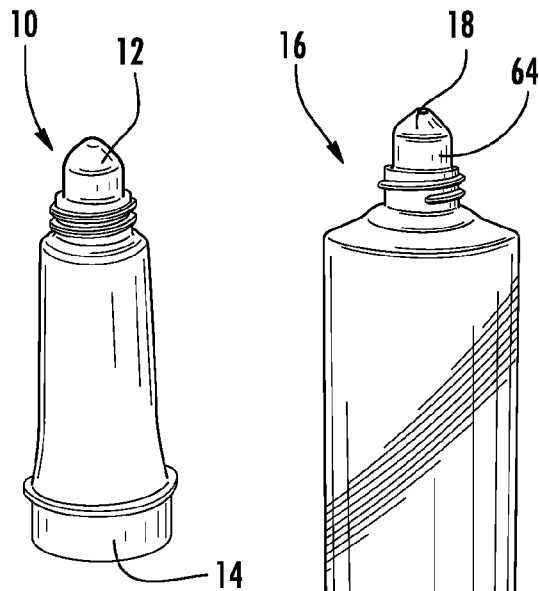
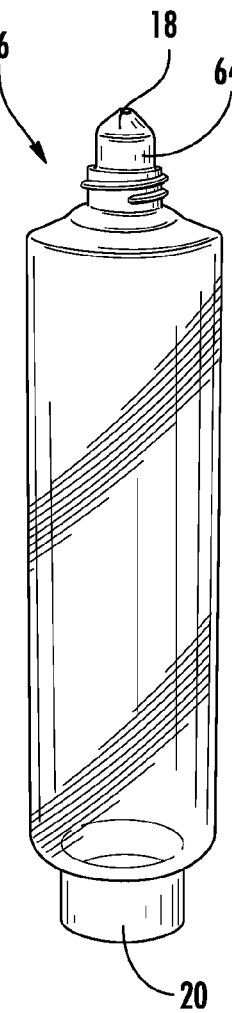
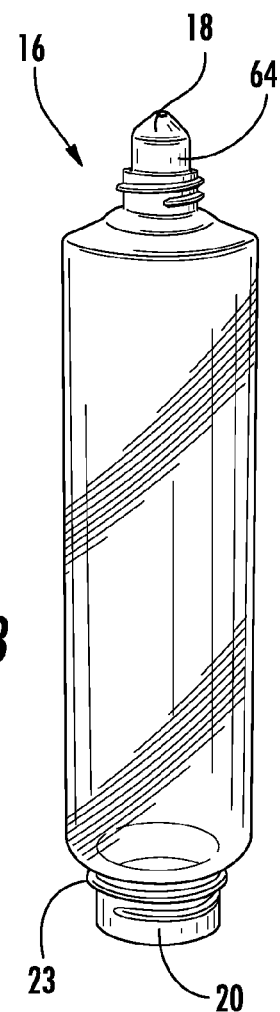
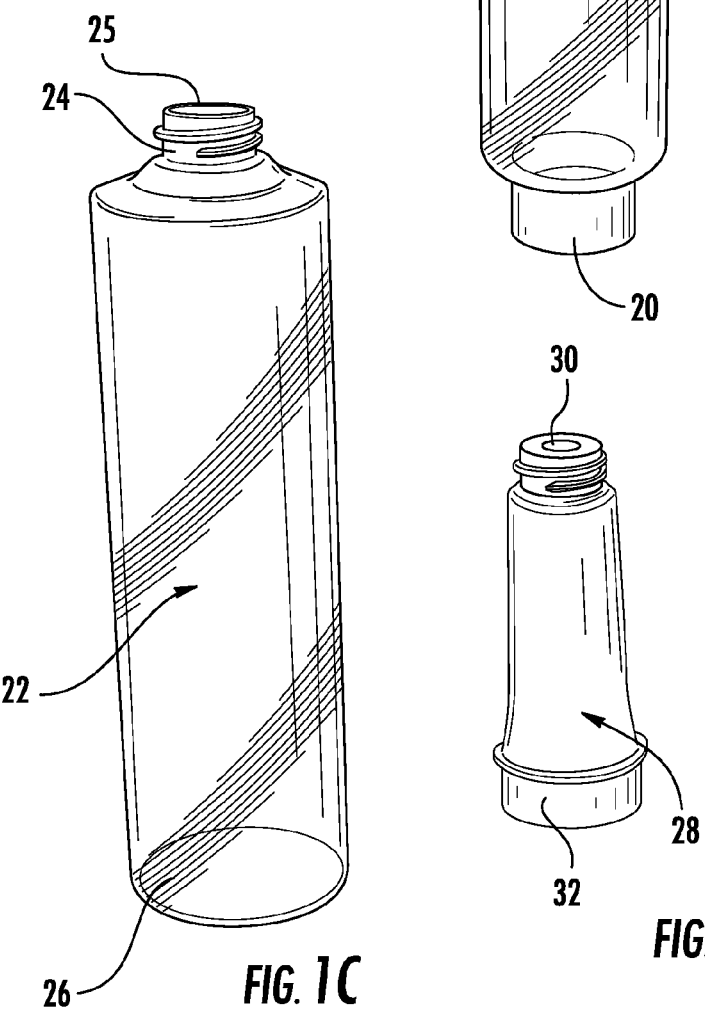
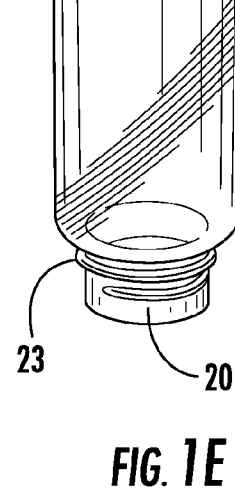
FIG. 1A
FIG. 1B
FIG. 1C
FIG. 1D
FIG. 1E

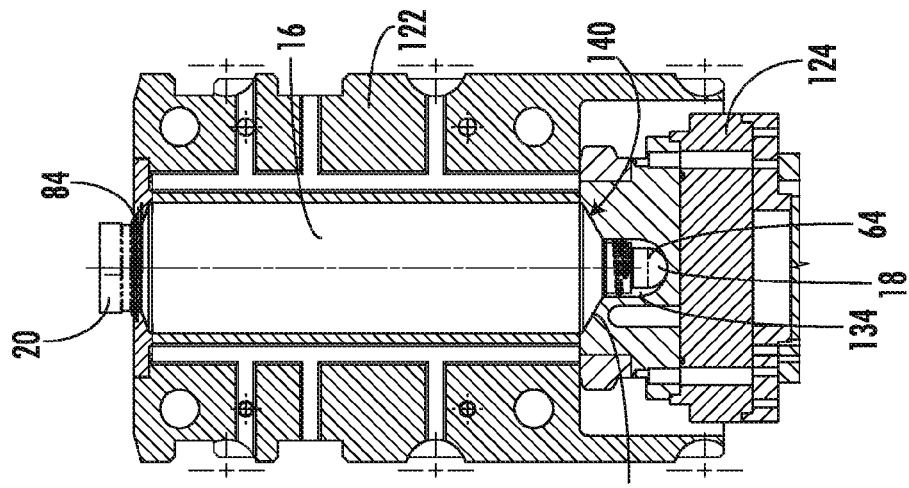
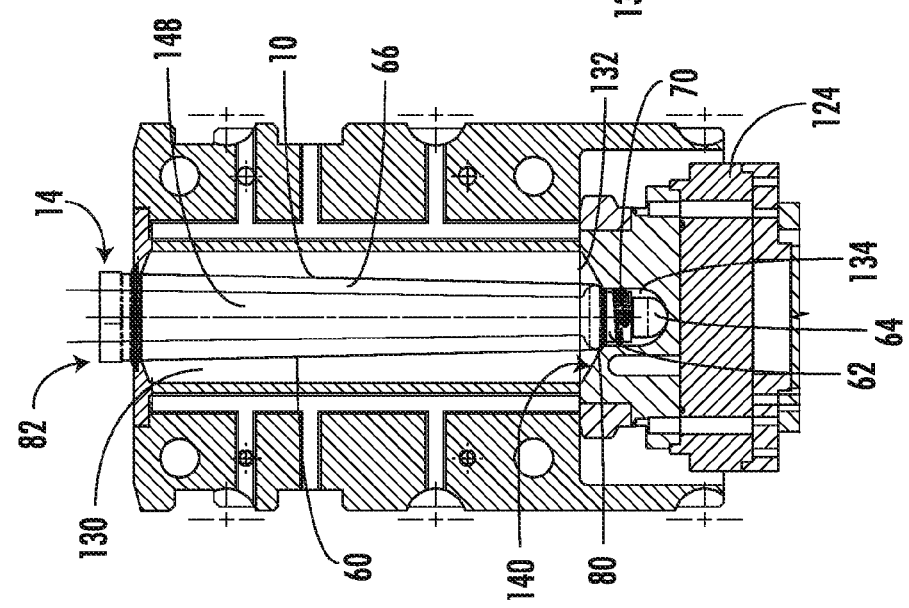
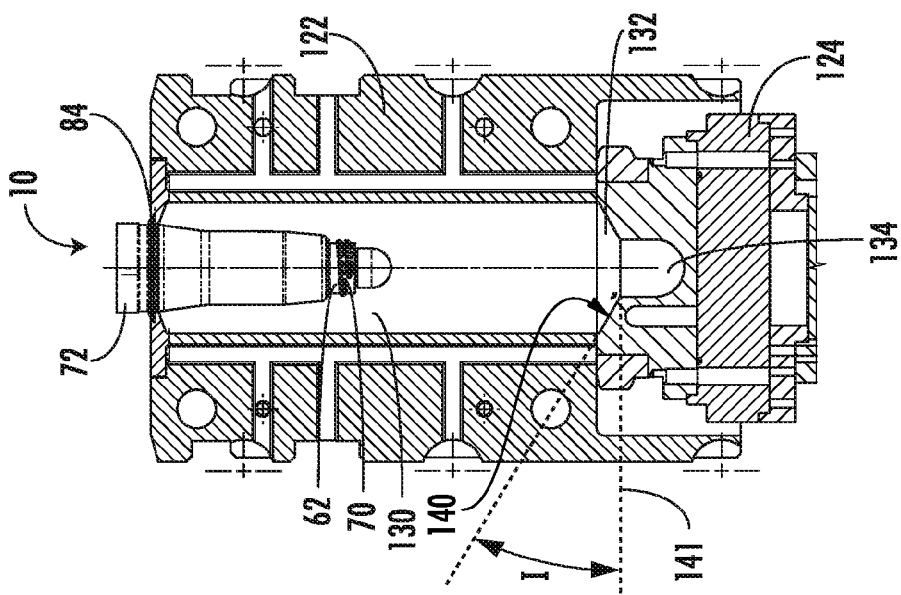

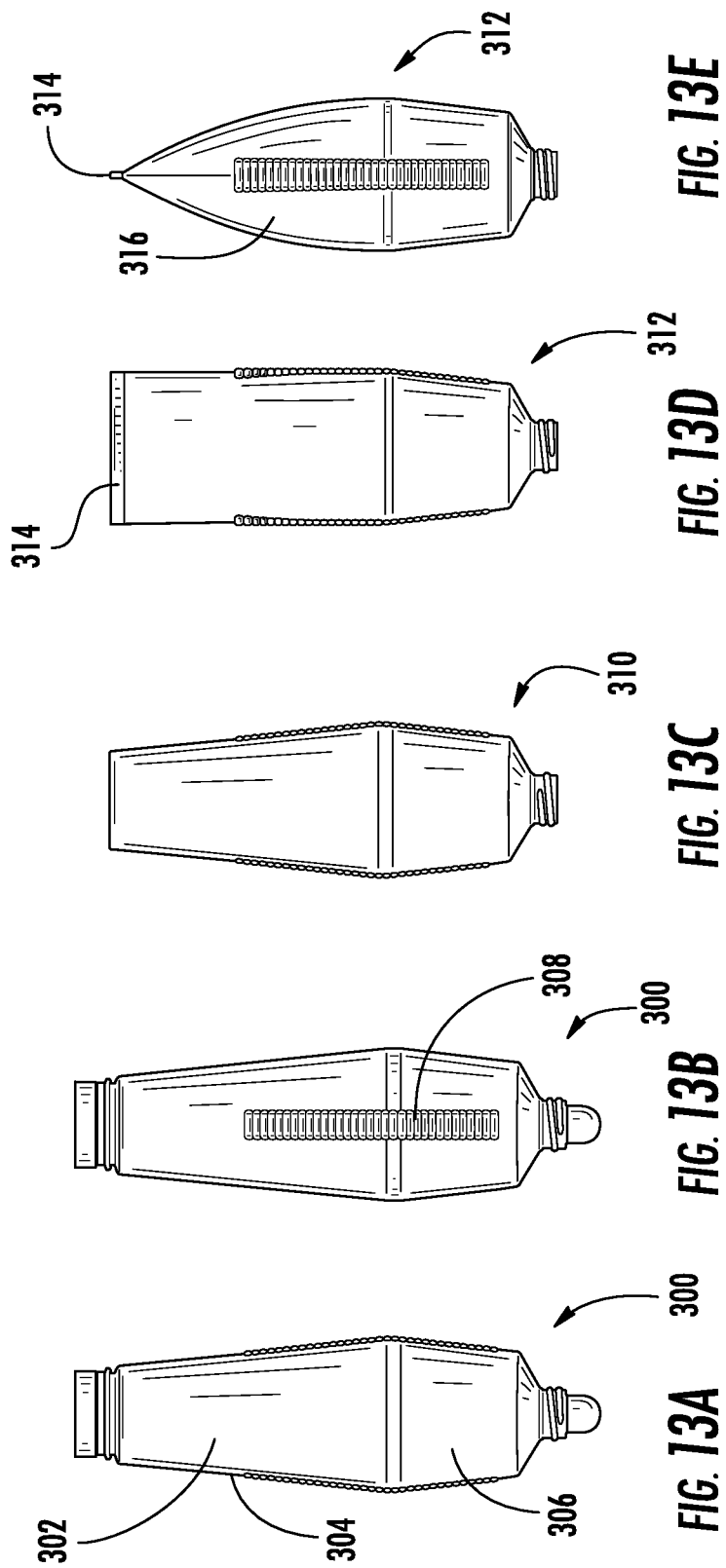

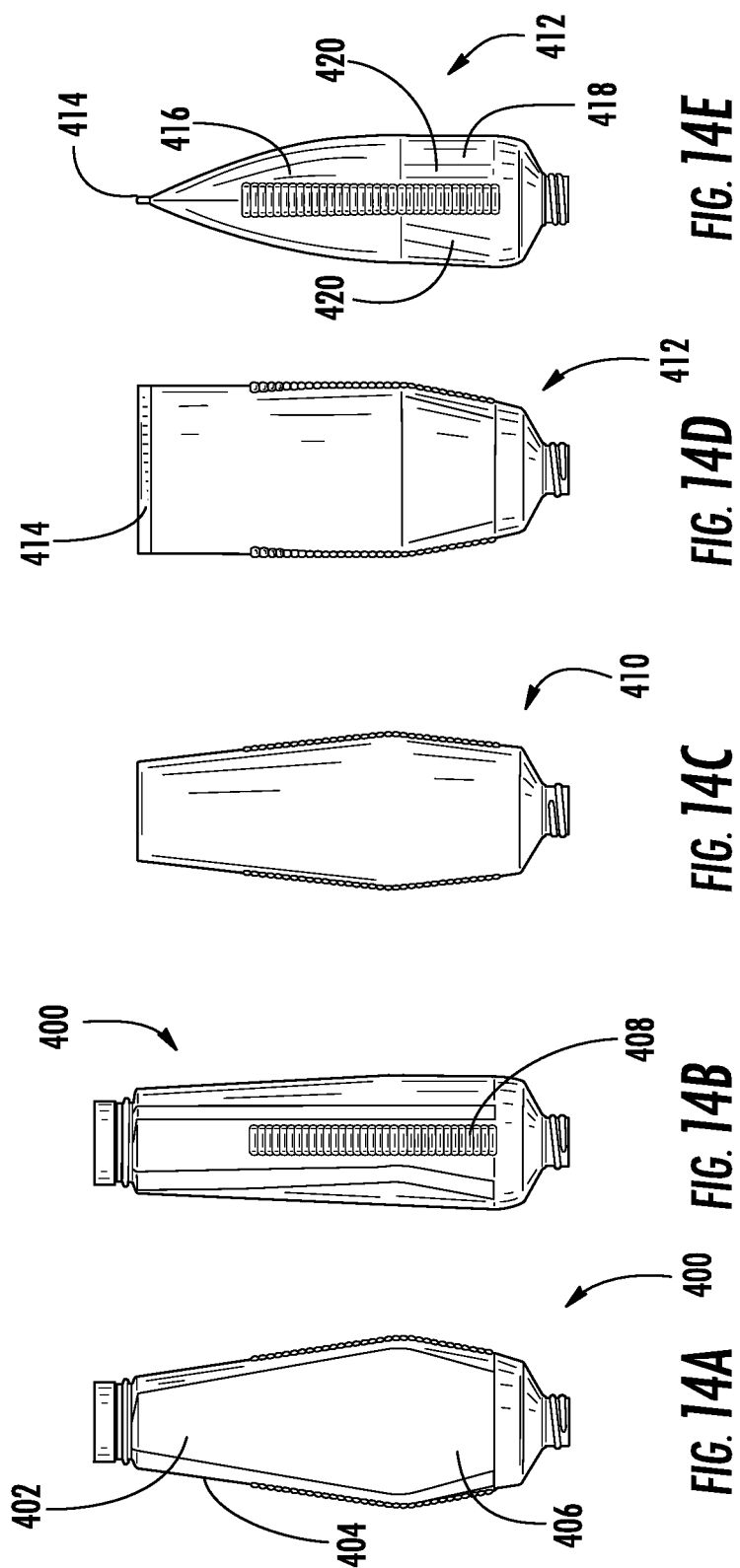

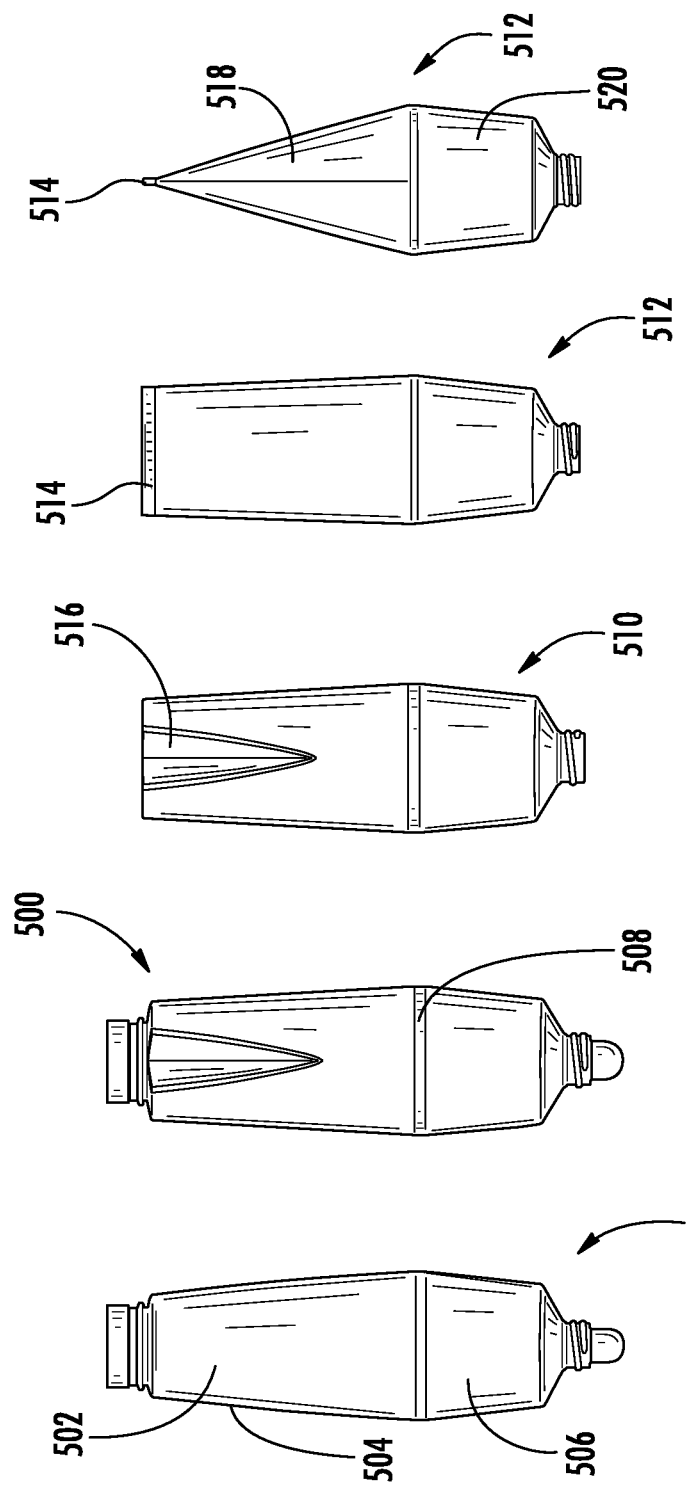

BLOW MOLDING METHOD AND APPARATUS FOR FORMING SQUEEZABLE PLASTIC CONTAINER

CROSS-REFERENCE TO RELATED PATENT APPLICATIONS

This application is a continuation of U.S. application Ser. No. 13/226,175, filed Sep. 6, 2011, which is a continuation of International Application No. PCT/US2011/046140, titled "Blow Molding Method and Apparatus for Forming Squeezable Plastic Container," filed Aug. 1, 2011, which claims the benefit of U.S. Provisional Application No. 61/400,885, titled "Method and Apparatus for Forming Tubular Containers," filed Aug. 4, 2010, each of which are incorporated herein by reference in their entireties.

BACKGROUND OF THE INVENTION

The present invention relates generally to the field of container formation. The present invention relates specifically to a method and apparatus for blow molding a squeezable container from an injection molded preform.

Squeezable tubular containers are used to hold a wide variety of products including household consumer products, food products, industrial products, medical products, etc. Typically, squeezable tubular containers are used to hold a material (e.g., a liquid, a gel, a paste, etc.) which has a consistency such that the material may be dispensed through a dispensing opening provided on the tubular container by squeezing the sides of the tubular container. Some materials or products that may be held in a squeezable tubular container include toothpaste, lotions, gels, glue, edible materials (e.g., squeezable cheese, tomato paste, etc.), cleaning products, pharmaceutical creams, etc.

Squeezable tubular containers are typically manufactured from an extruded plastic tube having a separate threaded head component that includes a dispensing opening. To make the complete container, an extruded tube of the desired length is produced, and the separate head component is attached or coupled to one end of the tube. The separate head component of such squeezable tubes are typically attached to the extruded plastic tube by welding or an adhesive that requires a separate step in the manufacturing process. Following attachment of the head component, the end of the tube opposite of the head component remains open. The tube is filled with the desired material, and the open end of the tube is sealed by crimping together the material of the open end.

Thus, an extruded tube manufactured via this process typically has a circular cross-section at the end that is attached to the head component and the opposite, crimped end is flat. Because a cylindrical tube (i.e., a tube having a constant diameter along its length) is used to make the tubular container during this process, the length of the crimped, flat end typically is about half of the circumference of the round end of the tube body adjacent the head component. Further, making tubes using the extrusion-based process may generate significant waste or scrap material due to the starting and stopping of the extrusion machinery or other machinery at various stages of the process. In addition, the extrusion-based process involves an additional step to attach the separate head component to the tubular container body.

SUMMARY OF THE INVENTION

One embodiment of the invention relates to a method for forming a container is provided. The method includes molding a preform having a sidewall, an interior cavity, an open end, a closed end, and a neck adjacent the closed end of the preform. The neck of the preform has an engagement structure. The method includes providing a blow mold system including a blow mold cavity. The method includes placing at least a portion of the preform into the blow mold cavity, and blow molding a one-piece container body from the preform by inflating the preform within the blow mold cavity. The container body has an open end, a closed end and a neck adjacent to the closed end. Wherein the open end of the container body is formed from the open end of the preform, and the closed end of the container body is formed from the closed end of the preform. The method includes creating a dispensing opening through the closed end of the container body.

Another embodiment of the invention relates to a preform having a sidewall with two tapered sections. Another embodiment of the invention relates to a preform having a closure engagement structure (e.g., threads, snap bead, etc.) formed adjacent the closed or gate end of the preform. A further embodiment of the invention relates to a blow molded tubular container produced from such a preform.

Another embodiment of the invention relates to a method for forming a plastic blow molded container. The method includes injection molding a preform from a plastic material. The preform includes a sidewall, an interior cavity, an open end, a closed end and a neck adjacent the closed end of the preform. The neck of the preform includes an engagement structure. The method also includes providing a blow mold system including a blow mold cavity and placing at least a portion of the preform into the blow mold cavity. The method includes blow molding a plastic one-piece container body from the preform by inflating the preform within the blow mold cavity. The container body includes an open end, a closed end and a neck adjacent to the closed end. The neck of the container body includes the engagement structure. The open end of the container body is formed from the open end of the preform, and the closed end of the container body is formed from the closed end of the preform. The method includes creating a dispensing opening through the closed end of the container body.

Another embodiment of the invention relates to a method for forming a plastic, blow molded, squeezable container including providing a blow mold. The blow mold includes a blow mold body defining a blow mold cavity and a blow mold base having a recess. The method includes providing an injection molded, plastic preform. The preform includes a sidewall, an interior cavity, an open end, a closed end and a threaded neck adjacent the closed end of the preform. The method includes placing the preform into the blow mold cavity such that the open end of the preform is positioned outside of the blow mold body and the threaded neck of the preform is located inside the blow mold cavity. The method includes stretching the preform within the blow mold such that the threaded neck of the preform is received within the recess of the blow mold base. The method includes blow molding a plastic one-piece container body from the preform by inflating the preform within the blow mold cavity. The container body includes an open end, a closed end and a threaded neck adjacent to the closed end. The open end of the container body is formed from the open end of the preform, and the closed end of the container body is formed from the closed end of the preform. The method includes cutting the closed end from the container body to create a dispensing opening at the threaded neck.

Another embodiment of the invention relates to a method for forming a plastic container including receiving an injection molded, plastic preform at a blow molding location including a blow mold. The preform includes a sidewall, an interior cavity, an open end, a closed end and a threaded neck adjacent the closed end of the preform. The blow mold includes a blow mold body defining a blow mold cavity and a blow mold base having a recess. Prior to blow molding, the preform is placed into the blow mold cavity such that the open end of the preform is positioned outside of the blow mold body and the threaded neck of the preform is located inside the blow mold cavity, and the preform is stretched within the blow mold such that the threaded neck of the preform is received within the recess of the blow mold base. A plastic one-piece container body is formed from the preform by inflating the preform within the blow mold cavity. The container body includes an open end, a closed end and a threaded neck adjacent to the closed end. The open end of the container body is formed from the open end of the preform, and the closed end of the container body is formed from the closed end of the preform. Following blow molding, the closed end is cut from the container body to create a dispensing opening at the threaded neck.

Another embodiment of the invention relates to a method for forming a plastic container including supplying an injection molded, plastic preform to a blow molding location including a blow mold. The preform includes a sidewall, an interior cavity, an open end, a closed end and a threaded neck adjacent the closed end of the preform. The blow mold includes a blow mold body defining a blow mold cavity and a blow mold base having a recess. Prior to blow molding, the preform is placed into the blow mold cavity such that the open end of the preform is positioned outside of the blow mold body and the threaded neck of the preform is located inside the blow mold cavity. The preform is stretched within the blow mold such that the threaded neck of the preform is received within the recess of the blow mold base. A plastic one-piece container body is formed from the preform by inflating the preform within the blow mold cavity. The container body includes an open end, a closed end and a threaded neck adjacent to the closed end. The open end of the container body is formed from the open end of the preform, and the closed end of the container body is formed from the closed end of the preform. Following blow molding, the closed end is cut from the container body to create a dispensing opening at the threaded neck.

Another exemplary embodiment of the invention relates to a blow mold system for producing a plastic squeezable container. The system includes a blow mold body defining a blow mold cavity and a blow mold base including a recess configured to receive a threaded preform neck during blow molding. The blow mold base is positioned below the blow mold body such that the recess of the blow mold base is located below the blow mold cavity.

Another exemplary embodiment of the invention relates to a plastic preform for use in a blow molding system to produce a blow molded plastic squeezable container. The preform includes a sidewall, an interior cavity, an open end, a closed end and a threaded neck located adjacent to the closed end. The sidewall of the preform includes an upper section having a first thickness and a middle section having a second thickness. The second thickness is greater than the first thickness. The sidewall of the preform includes a transition section between the upper section and the middle section, and the transition section has an increasing thickness that provides a transition from the thickness of the upper section to the thickness of the middle section. The sidewall of the preform also includes an inwardly angled shoulder section between the middle section and the neck of the preform. The diameter of the neck of the preform is less than the diameter of the middle section, and the inwardly angled shoulder section provides a transition from the greater diameter of the middle section to the smaller diameter of the neck.

Alternative exemplary embodiments relate to other features and combinations of features as may be generally recited in the claims.

BRIEF DESCRIPTION OF THE DRAWINGS

This application will become more fully understood from the following detailed description, taken in conjunction with the accompanying figures, wherein like reference numerals refer to like elements in which:

FIG. 1A is a perspective view of a preform according to an exemplary embodiment;

FIG. 1B is a perspective view of a blow molded container body according to an exemplary embodiment;

FIG. 1C is a perspective view of trimmed container body according to an exemplary embodiment;

FIG. 1D is a perspective view of a preform according to another exemplary embodiment;

FIG. 1E is a perspective view of a blow molded container body according to another exemplary embodiment;

FIG. 8 shows a preform located within a blow mold cavity prior to stretching, according to an exemplary embodiment;

FIG. 9 shows a preform located within a blow mold cavity after stretching, according to an exemplary embodiment;

FIG. 10 shows a container body following expansion located within a blow mold cavity, according to an exemplary embodiment;

FIG. 13A-13E show a container body, a trimmed container body and a tubular container according to another exemplary embodiment;

FIG. 14A-14E show a container body, a trimmed container body and a tubular container according to another exemplary embodiment;

FIG. 15A-15E shows a container body, a trimmed container body and a tubular container according to another exemplary embodiment;

DETAILED DESCRIPTION OF THE PREFERRED EMBODIMENTS

Figure 2:
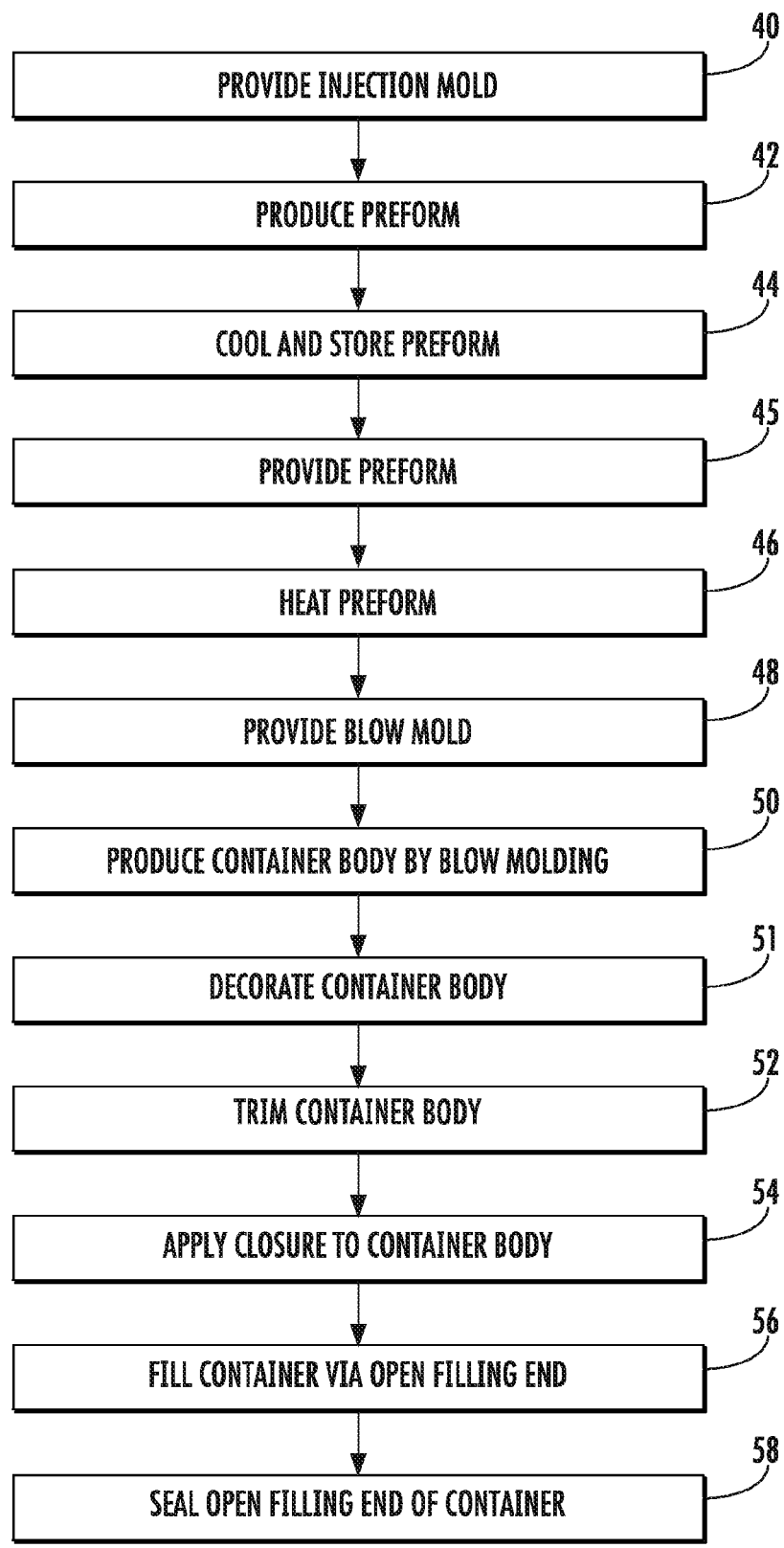
FIG. 2 is a flow diagram showing a multi-step process for producing a container, according to an exemplary embodiment.

Referring generally to the figures, a blow molding method and apparatus for making a squeezable or tubular container is shown according to various exemplary embodiments. The method generally includes making a preform via injection molding and making a tubular container from the preform via blow molding. In various embodiments, the closed end of either the preform or the blow molded container is cut or trimmed to create a dispensing opening, and the open end of the blow molded container is cut or trimmed to create a smooth opening that may be used to fill the container with the desired material. In one embodiment, the injection molded preform may be cooled and stored and/or transported for later use in the blow molding step. In one exemplary embodiment, the tubular container is made from a flexible material such that the tubular container is squeezable allowing material to be dispensed from the container by the user via squeezing.

According to the various exemplary embodiments, the containers discussed herein may hold and dispense various materials, including liquid materials, gel-type materials, paste type materials, powders, etc. In various embodiments, the containers discussed herein may hold or contain a variety of household or cosmetic materials including toothpaste, shampoo, soap, lotion, creams, sunscreen, ointment, liquid foods, food pastes (e.g., squeezable cheese, tomato paste, etc.), glue, cleaning products, etc. In other embodiments, the tubular containers discussed herein may hold or contain any other material that may be suitably contained in and dispensed from a container.

Referring to FIG. 1A-1E, various embodiments of preforms and blow molded containers are shown as they would appear after different stages of the manufacturing process discussed herein. Referring to FIG. 1A, preform 10 is shown following injection molding. Preform 10 includes a closed end 12 and an open end 14. As discussed in more detail below, preform 10 is blow molded to produce a tubular container body, shown as container body 16, in FIG. 1B. Container body 16 includes a closed end 18 and an open end 20. Container 16 is shown in FIG. 1B prior to trimming of closed end 18 and open end 20. FIG. 1C, shows trimmed container body 22. Trimmed container body 22 includes an open, dispensing end or neck 24 and an open filling end 26. As discussed in more detail below, closed end 18 of container body 16 is trimmed to produce a dispensing opening 25 located through neck 24 of trimmed container body 22, and open end 20 of container body 16 is trimmed to produce open filling end 26. While FIG. 1C shows dispensing opening 25 as a substantially circular opening, dispensing opening 25 may be other shapes/configurations as well. For example, dispensing opening 25 may be triangular, rectangular, star-shaped, three smaller openings, an array of small holes, etc.

Referring to FIG. 1D, a preform 28 is shown according to an exemplary embodiment. As shown, preform 28 includes an open dispensing end 30 and an opposing open end 32. In some embodiments, closed end 12 of preform 10 may be trimmed prior to blow molding to produce preform 28 with open dispensing end 30. In this embodiment, because trimming of the dispensing end occurs prior to blow molding, the container body does not need to be trimmed to produce a dispensing opening following blow molding. In another embodiment, a preform, similar to preform 28, may be injection molded including an open dispensing end 30 such that no trimming is needed to produce the open end. In this embodiment, a preform that is injection molded with two open ends, may then be blow molded to produce a tubular container body having two open ends without the need to trim to create a dispensing opening.

Referring to FIG. 1E, in one embodiment, container body 16 includes a closure engagement structure, shown as threads 23, located on the sidewall of open end 20 in addition to the threads located at closed end 18. In this embodiment, the finished container includes two open ends each sealed by a closure located at opposite ends of the container body, such that the finished container may provide two dispensing openings. In this embodiment, closed end 18 may be trimmed to create a dispensing opening, and open end 20 is not trimmed such that the threaded portion of open end 20 remains on the container. This embodiment provides a dual-open ended container that provides for dispensing openings located at opposite ends of the container body. In the embodiment shown, the dual open ended container includes dispensing openings of different sizes and specifically different diameters.

In various embodiments, the preforms (e.g., preforms 10 and 28) and the resulting blow molded containers may be made from a variety of materials. Preform 10 and preform 28 (and the resulting blow molded container bodies) may be made from a transparent or translucent material, and, in other embodiments, preform 10 and preform 28 (and the resulting blow molded container bodies) may be made from an opaque material. In various embodiments, preform 10 and preform 28 (and the resulting blow molded container bodies) may be formed from a plastic or polymer material.

In some embodiments, utilizing blow molding produces a squeezable container in which the material of the blow molded container is bi-axially oriented. A bi-axially oriented material is one in which the polymer molecules are oriented in two directions, and in the case of a blow molded polymer, the polymer molecules are aligned in the two primary directions of expansion (i.e., the longitudinal axis container and around the circumference of the container). In contrast to typical squeezable tubes produced via extrusion molding, a squeezable container made from bi-axially oriented polymer may have superior qualities, including superior strength and crack resistance, and better light transmission properties (e.g., clearer, more transparent, less light diffusion, etc.).

In one embodiment, preform 10 and preform 28 (and the resulting blow molded container bodies) may be made from a polypropylene material that allows the blow molded container to be squeezable (i.e., the sidewalls and/or end wall may be compressed by a user to cause dispensing of the material held by the container). In one such embodiment, the blow molding method discussed herein produces a container formed of a bi-axially oriented polypropylene. In this embodiment, the blow molded polypropylene container may be more transparent and clearer than extruded squeezable containers such that the container allows for superior viewing of the container contents and/or allows for labels to be positioned such that the user views the label through the container contents (e.g., a label affixed to the back wall of the container with label information facing inward toward the sidewall of the container). In some embodiments, preform 10 and 28 may be made from a single material, and in other embodiments, preform 10 and 28 may be formed from multiple layers. For example, perform 10 and 28 may include a first layer of material that acts an oxygen barrier (e.g., an ethylene vinyl alcohol ("EVOH") layer, a nylon layer, etc.) and a second layer of material that forms the body of the perform. In one such embodiment, the second layer may be an orientable, polymer material (e.g., polypropylene, polyethylene, polyethylene terephthalate, etc.).

FIG. 2 is a flow diagram of a multi-step process for producing a tubular container according to an exemplary embodiment. At step 40, an injection mold is provided, and at step 42, a preform, such as preform 10 or preform 700 discussed below, is produced using the injection mold. At step 44, the completed preform is removed from the injection mold and is cooled and stored for later use in the blow molding step. At step 44, the completed preform may also be transported from one location where the preforms are produced to another location where blow molding occurs.

At step 45 the preform is provided to a location that includes a blow mold, and the location having the blow mold receives the preform. In one embodiment, the blow mold location is different from the location at which injection molding occurs. For example, injection molding may occur in one portion of a manufacturing facility, blow-molding may occur at another portion of the facility, and the preform may be provided to the blow molding location from the injection molding portion of the manufacturing facility. In one such embodiment, the preform may be provided from the injection mold directly to the blow mold. In another embodiment, the preform may be provided from a storage location at the manufacturing facility to the blow mold location. The storage location may be a long-term storage location (e.g., a warehouse) or a short-term storage location (e.g., a bin or hopper adjacent the blow mold). In another embodiment, the preform may be provided from an injection mold location owned or operated by a first party to a blow mold location owned or operated by a second party. In this embodiment, the preform may be received at the blow mold location by the second party.

At step 46, the preform is heated or conditioned to the appropriate temperature to allow for stretching and expansion during blow molding. In one embodiment, the closed end, threads and the open end of the preform are shielded from heating during the conditioning step. Shielding components of the preform from heating may help prevent or reduce deformation of the shielded portions of the preform during blow molding. In other embodiments, the preform may be blow molded directly following injection molding such that the preform is not cooled and stored following injection molding. In this embodiment, because the preform is typically hot immediately following injection molding, the preform may not need to be heated or conditioned prior to blow molding.

At step 48, a blow mold is provided. In one embodiment, the interior cavity of the blow mold is shaped to produce a generally tubular-shaped container body. In various embodiments, the interior cavity may be shaped to produce a non-smooth sidewall surface in the completed tubular container. For example, the surface of the interior cavity of the blow mold may include patterns, textures, lettering, etc., that will be formed in the outer surface of the container during blow molding.

At step 50, a container body is produced via blow molding. At step 50, a pressure differential is created between the interior of the preform and the interior of the blow mold causing the preform to expand into conformance with the interior of the blow mold to create a container body, such as container body 16, shown in FIG. 1B. In one embodiment, the pressure differential is produced by blowing air into the interior of the preform causing the preform to expand. In one such embodiment, the blow mold is a stretch blow mold, and the preform is stretched via an internal stretch rod prior to or during expansion.

At step 51, the container body may be decorated as desired for a particular application. For example, at step 51 an adhesive label may be coupled to the outer surface of container body 16, or a label may be printed directly to the container body using a suitable printing technique (e.g., a silk screening printing method). Label application may be completed via a label application device (e.g., label printer, label applicator, etc.). In one embodiment, step 51 occurs following blow molding of the container body and before trimming of the container body. In such embodiments, the pre-trimmed container body may be more rigid than the container body following trimming, and the rigidity of the pre-trimmed container facilitates the application of the label to the container body. The container body may be pressurized during label application to support the wall of the container during label application. In contrast to the method described above, typically a squeezable, tubular container formed by an extrusion method is supported internally via a mandrel to provide rigidity to the body sufficient to allow for labeling. Thus, in one embodiment, the blow molded container body discussed herein may be labeled without the insertion of a supporting element, such as a mandrel, into the container body. As discussed in more detail below, the outer surface of container body 16 may include surface indicia, such as patterns, surface textures, lettering, etc., formed in the material of the container body during blow molding, and, in one embodiment at step 51, a label may be applied to the outer surface of the container body such that the applied label and the blow molded surface indicia cooperate to form a complete label element (e.g., complete label element 620 shown in FIG. 16).

At step 52, the closed end of the container body is trimmed creating a dispensing opening, and the open end of the container body is trimmed to create an open filling end. As explained in more detail below, the blow mold may include one or more trimming or cutting devices configured to trim the container body prior to removal from the blow mold. In another embodiment, the container body may be removed from the blow mold prior to trimming, and the container body may be trimmed using a separate trimming or cutting device. In yet another embodiment, the open end of the container body is not trimmed following blow molding, and the open end of the container body acts as the filling end of the container without being trimmed.

At step 54, a closure or cap is applied to the dispensing end of the trimmed container via threads or other engagement structures. At step 56, the trimmed container is filled via the open filling end with the desired material. In one embodiment, capping and filling may occur at the same facility as the blow molding and trimming immediately following step 52, and, in another embodiment, the trimmed container body may be shipped to a different facility for capping and filling. At step 58, the open end of the trimmed, filled container body is sealed. With the container filled and sealed, the container may then be stored and shipped and used by the end user. In another embodiment, the end opposite the dispensing opening may be sealed prior to filing, and the container is filed through the dispensing end.

Figure 3:
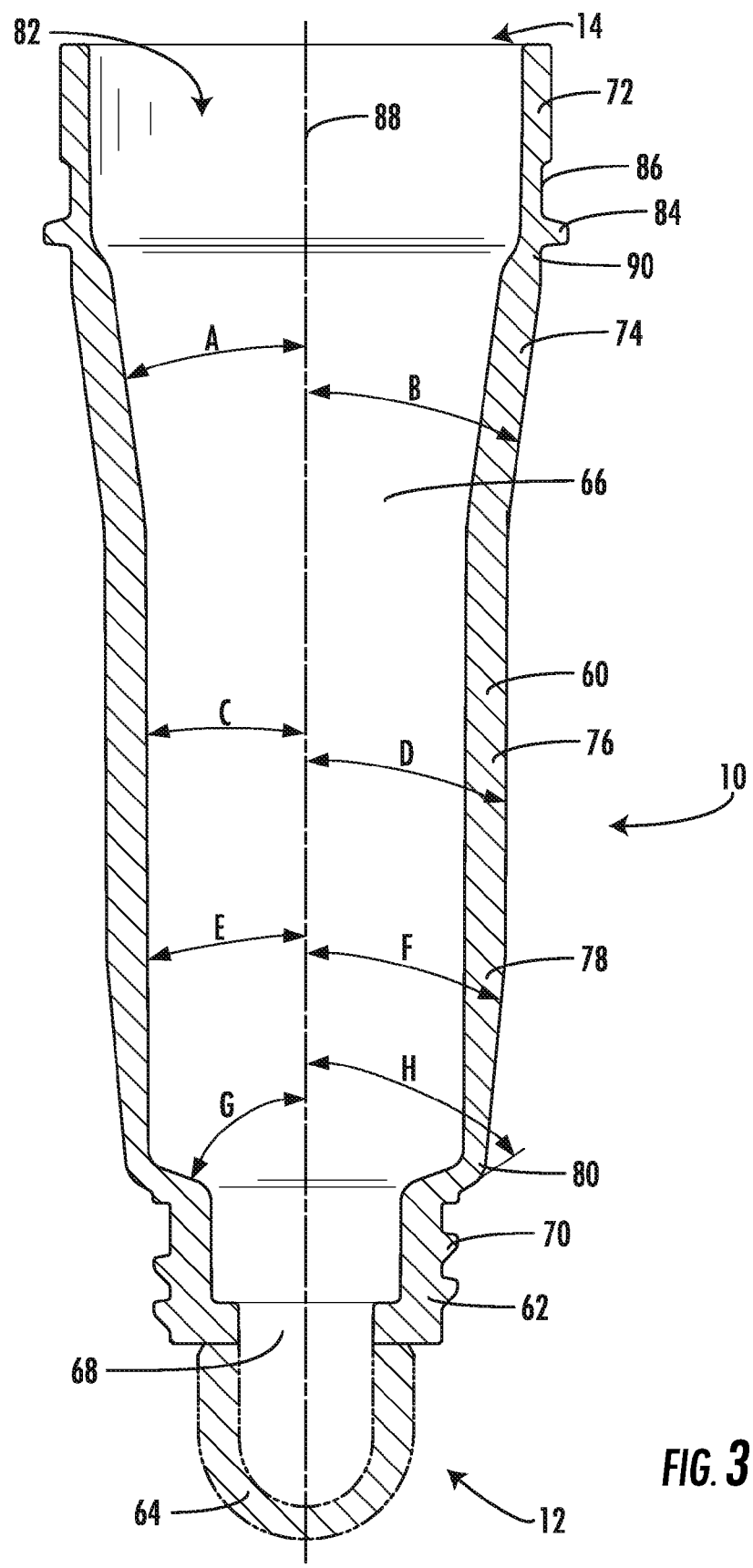
FIG. 3 is a cross-sectional view of a preform according to an exemplary embodiment.

Referring to FIGS. 3-10, further aspects of the multi-step method and apparatus for producing a container are shown according to various exemplary embodiments. Referring specifically to FIG. 3, a cross-sectional view of preform 10 is shown according to an exemplary embodiment. Perform 10 includes a closed end 12 and an open end 14. Perform 10 includes a body sidewall 60 and a neck 62. A generally-domed shaped end section 64 extends from the lower end of neck 62 to form closed end 12. In other embodiments, end section 64 may be other shapes (e.g., conical, cubical, etc.). Perform 10 includes an interior chamber 66. Interior chamber 66 terminates in an opening or aperture 68 located through the lower end of neck 62. Aperture 68 becomes dispensing opening 25 (shown in FIG. 1C) following removal of end section 64. In addition, neck 62 includes a closure engagement structure, shown as threads 70.

Body sidewall 60 of preform 10 includes an upper section 72, a middle section including a first transition section 74, a central section 76, a second transition section 78 and a shoulder section 80. Upper section 72 extends generally upward from the upper end of first transition section 74. As shown in FIG. 3, interior chamber 66 terminates in an opening or aperture 82 defined by the upper edge of upper section 72 located at the open end 14 of preform 10. Perform 10 includes a rim, bead or ring 84 extending from and generally perpendicular to the outer surface of upper section 72. Preform 10 also includes a circumferential recess 86 formed in the outer surface of upper section 72 above ring 84. In one embodiment, ring 84 and circumferential recess 86 act as a handling feature that may be utilized to hold and manipulate the preform during various stages of processing and manufacturing. However, in other embodiments, preform 10 may not include either ring 84 or recess 86 and are configured to be handled by other means.

In the embodiment shown, the interior surface of upper section 72 defines the maximum internal diameter of interior chamber 66. As shown in the embodiment of FIG. 3, the open, upper section 72 of preform 10 does not include a closure engagement structure (e.g., threads, snap beads, etc.). In another embodiment, both upper section 72 and neck 62 may include closure engagement structures. In this embodiment the preform may be used to produce a container (e.g., a dual-open ended container) having closures and dispensing openings located at both ends of the container body. An example of dual-open ended container body is shown in FIG. 1E.

First transition section 74 extends from the lower end of upper section 72 to the upper end of central section 76. First transition section 74 is inwardly angled or tapered inward transitioning from the upper section 72 to the central section 76 such that both the inner and outer diameter of preform 10 along first transition section 74 decrease as the distance from open end 14 increases. As shown, first transition section 74 is positioned at a non-zero angle relative to the central axis 88 of perform 10. Angle A indicates the angle between the inner surface of first transition section 74 and the central axis 88, and angle B indicates the angle between the outer surface of first transition section 74 and central axis 88. In the embodiment shown, angle A and angle B are equal to each other resulting in first transition section 74 having a substantially constant wall thickness along its length. In other exemplary embodiments, angle A and angle B may be different from each other. In various exemplary embodiments, angles A and B may be between about 0 degrees and about 80 degrees. In particular embodiments, angles A and B may be between about 1 degree and about 45 degrees, particularly between about 1 degree and about 20 degrees, and more particularly between about 5 degrees and about 10 degrees. In the exemplary embodiment shown in FIG. 3, the angles A and B are between about 6 degrees and about 9 degrees, specifically are about 8 degrees, and more specifically are about 7 degrees and 55 minutes.

Preform 10 includes another transition section, shown as reduced thickness portion 90, located at the upper end of first transition section 74. Portion 90 is located between and joins first transition section 74 to the lower end of upper section 72. As shown in FIG. 3, the thickness of portion 90 decreases as the distance to open end 14 decreases to provide a transition from the greater thickness of first transition section 74 to the smaller thickness of upper section 72.

Central section 76 extends from the lower end of first transition section 74 to the upper end of second transition section 78. Central section 76 is slightly inwardly angled or tapered such that the inner and/or outer diameter of preform 10 along central section 76 decrease as the distance from open end 14 increases. As shown, central section 76 is positioned at a slight non-zero angle relative to the central axis 88 of perform 10. In other embodiments, central section 76 may be a non-tapered section positioned parallel to central axis 88. Angle C indicates the angle between the inner surface of central section 76 and the central axis 88, and angle D indicates the angle between the outer surface of central section 76 and the central axis 88. In the embodiment shown, angle C and angle D are equal to each other resulting in the central section 76 having a substantially constant wall thickness along its length. In other exemplary embodiments, angle C and angle D may be different from each other. In various exemplary embodiments, angles C and D may be between about 0 degrees and about 45 degrees. In particular embodiments, angles C and D may be between about 0 degrees and about 10 degrees, particularly between about 0 degrees and about 5 degrees, and more particularly between about 0 degrees and about 2 degrees. In the exemplary embodiment shown in FIG. 3, the angles C and D are between about 0 degrees and about 1 degree, and more specifically angles C and D are about 15 minutes.

Second transition section 78 extends from the lower end of central section 76 to the upper end of shoulder 80. Second transition section 78 is inwardly angled or tapered such that both the inner and outer diameter of preform 10 along second transition section 78 decrease as the distance from open end 14 increases. As shown, second transition section 78 is positioned at a non-zero angle relative to the central axis 88 of perform 10. Angle E indicates the angle between the inner surface of second transition section 78 and the central axis 88. In the embodiment shown angle E is substantially equal to angle C such that the angle of the inner surface of the preform relative to central axis 88 remains constant over the length of central section 76 and second transition section 78. In one such embodiment, angle E is about 15 minutes.

Angle F indicates the angle between the outer surface of second transition section 78 and central axis 88. In the embodiment shown, angle F is greater than angle E such that the wall thickness of second transition section 78 decreases along its length as the distance from open end 14 increases. In other exemplary embodiments, angle E and angle F may be equal to each other such that the wall thickness of second transition section 78 is constant. In various exemplary embodiments, angle F may be between about 0 degrees and about 80 degrees. In particular embodiments, angle F may be between about 1 degree and about 45 degrees, particularly between about 1 degree and about 20 degrees, and more particularly between about 5 degrees and about 10 degrees. In the exemplary embodiment shown in FIG. 3, the angle F is between about 4 degrees and about 6 degrees, specifically is about 5.5 degrees, and more specifically is about 5 degrees and 25 minutes.

Shoulder section 80 is located between and joins second transition section 78 to neck 62. Shoulder section 80 extends away from the lower end of second transition section 78 and inwardly toward central axis 88. Angle G indicates the angle between the inner surface of shoulder section 80 and the central axis 88, and angle H indicates the angle between the outer surface of shoulder section 80 and the central axis 88. In the embodiment shown, angle G is greater than angle H such that the wall thickness of shoulder section 80 increases along its length as the distance from open end 14 increases. In this arrangement, shoulder section 80 provides a transition from the smaller wall thickness located at the lower end of second transition section 78 to the greater wall thickness of neck 62. Further because the internal diameter of neck 62 is less than the internal diameter at second transition section 78, the inward angle of shoulder section 80 provides the transition from the greater diameter of section 78 and the smaller diameter of neck 62. In other exemplary embodiments, angle G and angle H may be equal to each other such that the wall thickness of shoulder section 80 is constant.

In various exemplary embodiments, angle G may be between about 10 degrees and about 90 degrees. In particular embodiments, angle G may be between about 40 degrees and about 80 degrees, particularly between about 50 degrees and about 80 degrees, and more particularly between about 60 degrees and about 80 degrees. In the exemplary embodiment shown in FIG. 3, angle G is between about 65 degrees and about 75 degrees and more specifically is about 70 degrees. In various exemplary embodiments, angle H may be between about 10 degrees and about 90 degrees. In particular embodiments, angle H may be between about 30 degrees and about 90 degrees, particularly between about 40 degrees and about 80 degrees, and more particularly between about 50 degrees and about 70 degrees. In the exemplary embodiment shown in FIG. 3, angle H is between about 55 degrees and about 65 degrees and more specifically is about 60 degrees.

In various embodiments, first transition section 74 and second transition section 78 facilitate the formation of a tubular-shaped container (e.g., the containers shown in FIGS. 11-16) during blow molding. In this embodiment, the inward taper provided by first transition section 74 and the reduction in sidewall thickness provided by portion 90 facilitates production of the tubular container body during blow molding by helping to ensure proper expansion of preform 10 upon inflation. In addition, the inward taper and reduction in wall thickness provided by second transition section 78 and the inward taper of shoulder section 80 facilitate the molding of the shoulder portion of the container adjacent the neck finish during blow molding. In various embodiments, the various angles of the sections of preform 10 discussed above are selected to facilitate the formation of containers of various shapes and sizes.

As shown in FIGS. 1 and 3, preform 10 is radially symmetric about central axis 88, and specifically, preform 10 is shaped such that cross-sections taken perpendicular to central axis 88 are generally circular. However, in various embodiments, preform 10 may be formed as other shapes. For example, the cross-section of preform 10 taken perpendicular to central axis 88 may be square, rectangular, triangular, other multi-sided shapes, elliptical, oval, etc. In other embodiments, preform 10 may be an irregular shape such that the cross-sectional shape of preform 10 may vary along central axis 88. An extrusion based method for producing a squeezable container is typically limited to the production of container body that is a right-cylinder. In contrast, the blow molding apparatus and method discussed herein are capable of producing squeezable containers in a wide variety of shapes.

Figure 4:
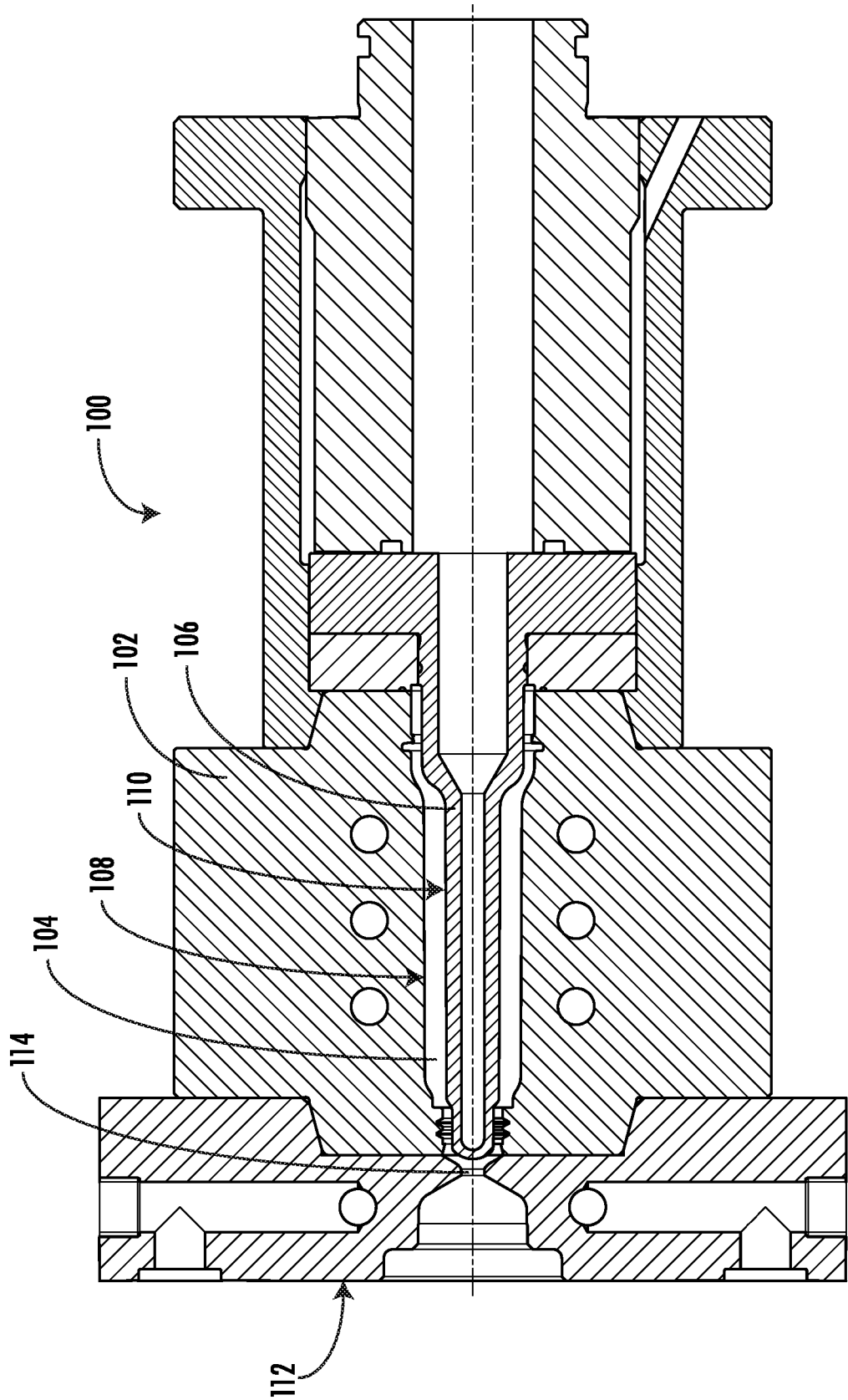
FIG. 4 is a cross-sectional view of an injection mold configured to form the preform of FIG. 3, according to an exemplary embodiment.

Referring to FIG. 4, an injection mold system 100 configured to produce preform 10 is shown according to an exemplary embodiment. Generally, injection mold system 100 includes a mold body 102 that includes mold cavity 104. Located within mold cavity 104 is a core insert 106. The inner surface 108 of cavity 104 is shaped to create the contours of the outer surface of preform 10 including the contours of neck 62 and threads 70, and the outer surface 110 of core insert 106 is shaped to create the contours of the inner surface of preform 10 during injection molding. Injection mold system 100 utilizing mold cavity 104 and core insert 106 allows for preform 10 to be formed with precisely controlled inner and outer diameters. In particular, injection mold system 100 allows for precisely molded inner and outer diameters at neck 62 and threads 70. In one embodiment, injection mold system 100 includes a first split ring plate that facilitates molding of neck 62 of preform 10 (shown in FIG. 3) and a second split ring plate that facilitates molding of ring 84 and recess 86 (shown in FIG. 3) adjacent the open end of preform 10.

Injection mold system 100 includes a resin injection system 112 that is in fluid communication with cavity 104 such that liquid resin is permitted to flow into mold cavity 104 to produce preform 10. In one embodiment, resin injection system 112 includes a gate 114 that opens and closes to control flow of liquid resin from resin injection system 112 to mold cavity 104. In another embodiment, resin injection system 112 may be a thermal gated system in which the opening into the injection mold cavity remains open and flow of liquid resin into the mold cavity is controlled by controlling the temperature and/or pressure of the liquid resin within resin injection system 112. As shown in FIG. 4, the "gate end" of mold cavity 104 (i.e., the end of mold cavity 104 adjacent gate 114) is shaped to form the neck and threads of preform 10, and the "open end" of mold cavity 104 (i.e., the end of mold cavity 104 opposite gate 114) is shaped to form ring 84 and upper section 72 of preform 10.

Figure 5:
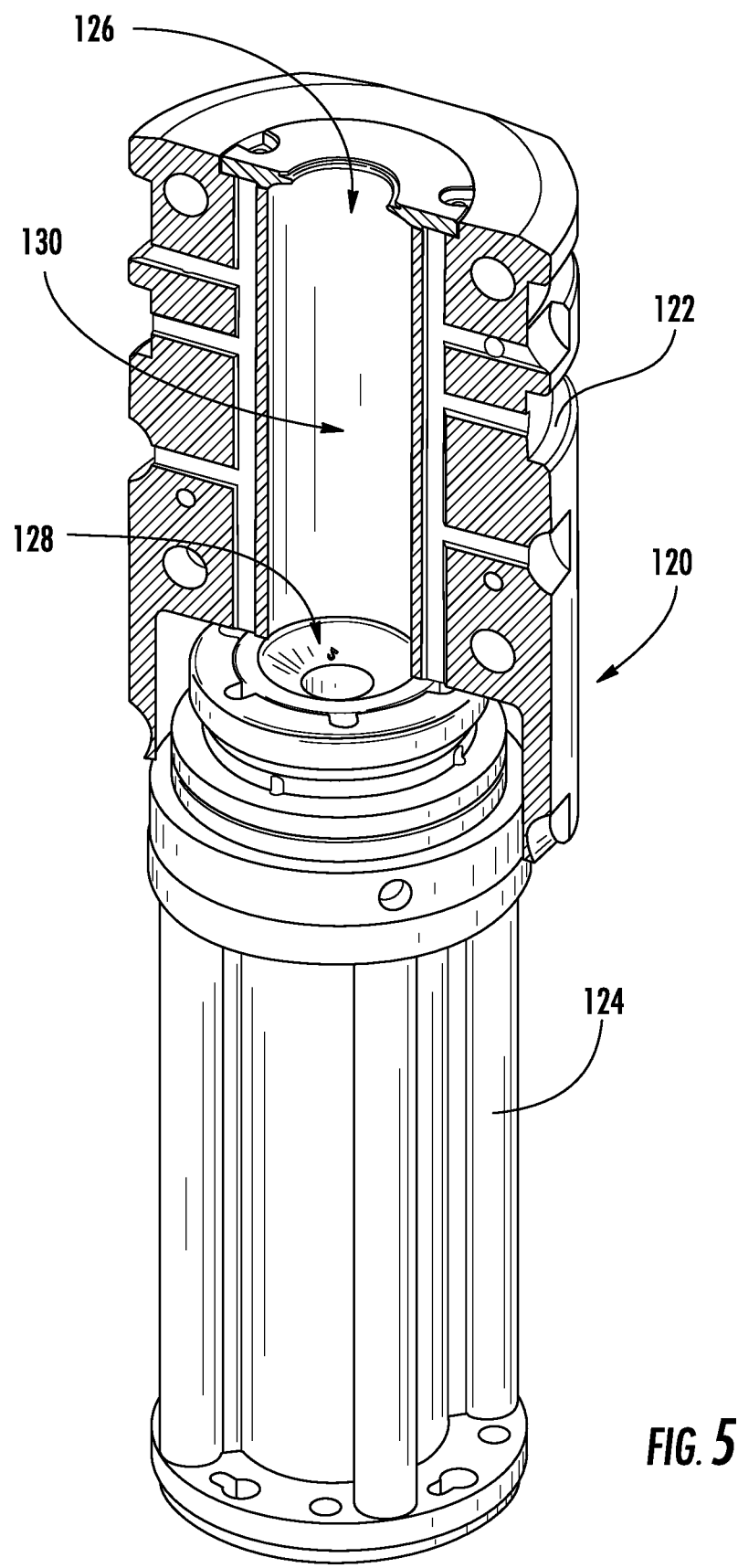
FIG. 5 is a perspective view of a blow mold system, according to an exemplary embodiment.
Figure 6:
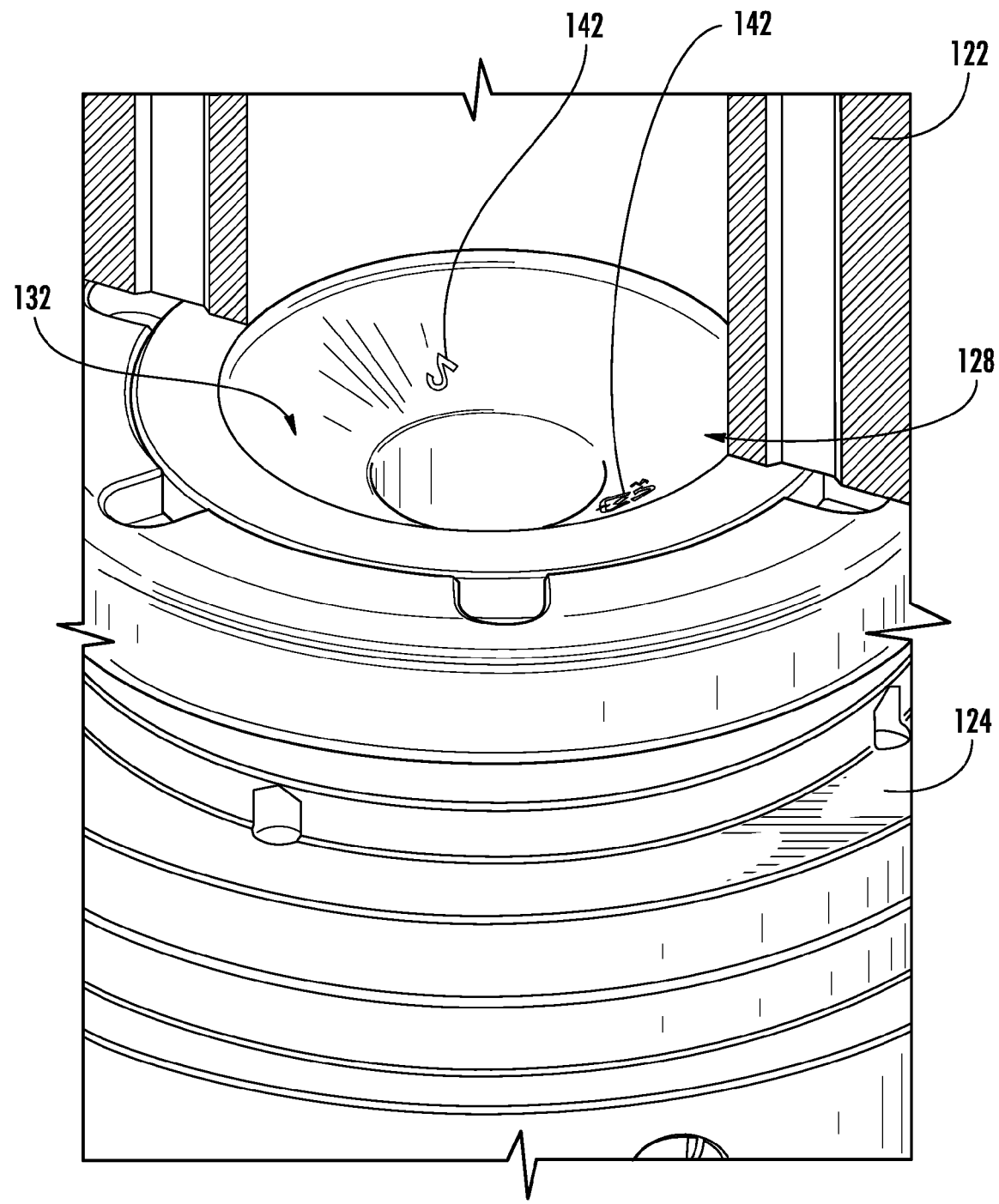
FIG. 6 is an enlarged perspective view showing a portion of the base of the blow mold system of FIG. 5, according to an exemplary embodiment.
Figure 7:
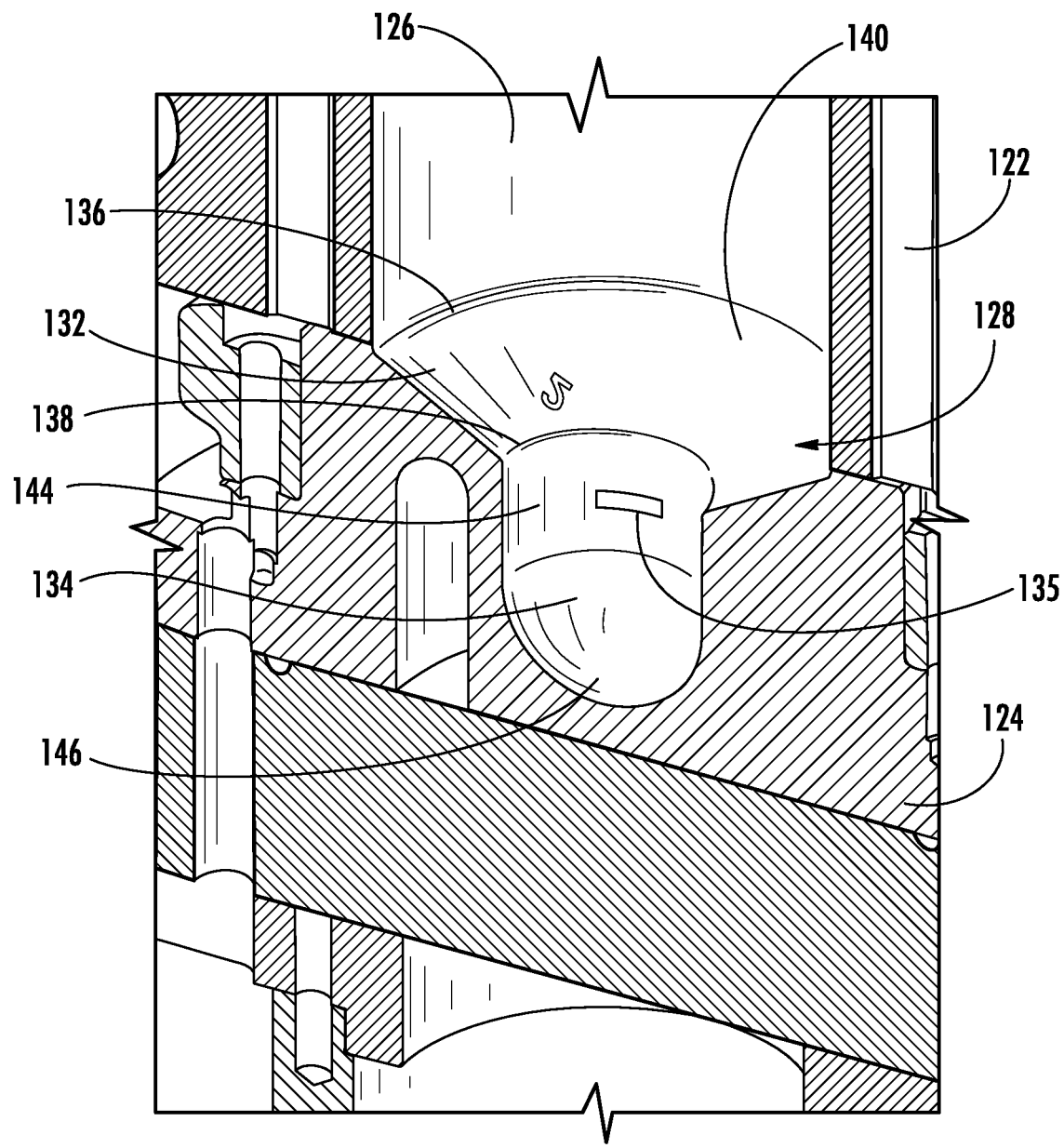
FIG. 7 is an enlarged perspective sectional view showing a portion of the base of the blow mold system of FIG. 5, according to an exemplary embodiment.

Referring to FIGS. 5-7, a blow mold system 120 is shown according to an exemplary embodiment. Blow mold system 120 includes a mold body 122 and a base portion 124. Mold body 122 includes a hollow center or cavity, shown as bore 126. Base portion 124 includes a recess 128 located in the upper end of base portion 124. Together, the inner surface of bore 126 and recess 128 define a blow mold cavity 130 in which a container may be formed. During blow molding, the preform is inflated or expanded into conformance with the inner surface of blow mold cavity 130 such that the contour or shape of the inner surface of blow mold cavity 130 generally defines the shape of the container. Blow mold cavity 130 may be shaped to produce a container body of a variety of cross-sectional shapes (e.g., square, rectangular, triangular, other multi-sided shapes, elliptical, oval, irregular shapes, etc.). It should be understood that only one half of mold body 122 is shown in FIG. 5 such that the internal components of mold body 122 are visible. During blow molding, the corresponding or mating halves of mold body 122 are closed together forming the complete blow mold cavity. While blow mold system 120 shows mold body having two pieces which together form blow mold cavity 130, in other embodiments, blow mold system 120 may include two or more cooperating pieces which together form blow mold cavity 130.

As shown in FIG. 5, mold body 122 is positioned above mold base 124. Recess 128 is a depression or cavity formed in an upper surface of mold base 124. As shown, recess 128 is positioned below bore 126 of mold body 122. In this embodiment, to produce a container with a centrally located neck portion, the longitudinal axis of recess 128 and the longitudinal axis of bore 126 are in substantial alignment with each other.

FIG. 6 and FIG. 7 both show enlarged views of the upper end of mold base portion 124. Specifically, FIG. 6 shows an enlarged view of the upper end of blow mold base portion 124 showing recess 128, and FIG. 7 shows a sectional view of the upper end of blow mold base portion 124 shown in FIG. 6. Referring to FIGS. 6 and 7, recess 128 of mold base portion 124 includes two concentric wells of different diameters and different shapes and located at different depths in base 124. In the embodiment shown, recess 128 includes a first portion, shown as upper well 132, and a second portion, shown as lower well 134, and upper well 132 is located above lower well 134 within base 124. Upper well 132 is generally frustoconical in shape and includes an outer edge 136, an inner edge 138 and an upper surface 140.

Upper surface 140 is angled relative to the longitudinal axis of mold body 122 such that upper surface 140 extends at an angle, downward toward the upper edge of lower well 134. As shown best in FIG. 8, the angle I indicates the angle between upper surface 140 and the horizontal axis 141. As shown in FIG. 10, the angle of upper surface 140 defines the angle of the outer surface of the shoulder of the container body adjacent the neck created using blow mold system 120. In various exemplary embodiments, angle I may be between about 0 degrees and about 80 degrees. In particular embodiments, angle I may be between about 0 degrees and about 60 degrees, particularly between about 10 degrees and about 50 degrees, and more particularly between about 20 degrees and about 40 degrees. In the exemplary embodiment shown in FIG. 8, angle I is between about 25 degrees and about 35 degrees and more specifically is about 30 degrees. Referring back to FIG. 6 and FIG. 7, in one embodiment, upper surface 140 may include one or more indicia 142 configured to create a corresponding imprint of the indicia on a portion of the outer surface of the blow molded container.

As shown in FIG. 7, lower well 134 is located below upper well 132 within base 124. Lower well 134 includes a generally cylindrical shaped sidewall portion 144 and a generally concave wall portion 146 that forms the end wall of lower well 134. Sidewall portion 144 is generally vertical (i.e., parallel to the longitudinal axis of base 124) and extends downward from inner edge 138 of upper well 132. As explained in greater detail below, lower well 134 is shaped to receive neck 62 of preform 10 during blow molding.

As shown in the embodiment of FIGS. 5-7, blow mold system 120 is modular in that mold body 122 and base 124 are separate, interchangeable components. In particular, recess 128 is formed in base 124 that is separate from (i.e., non-integral with) mold body 122. Thus, blow mold system 120 as shown is a three piece mold system including a base 124 and two mold body halves making up mold body 122. Blow mold system 120 may include one or more bases 124 with different sized or shaped recesses 128. For example, blow mold system 120 may include a first base 124 having a recess 128 of a first size or shape and a second base 124 having a recess 128 of a second size or shape. This allows mold body 122 to be used to make containers having different sized necks and/or shoulder angles by only switching the type of base used with mold body 122. In another embodiment, base 124 may include two mating halves that are joined together to form base 124. In one such embodiment, mold body 122 may be a two-piece mold in which the halves of base 124 are integral with the adjacent halves of mold body 122.

FIGS. 8-10 show various stages of the blow molding process utilizing preform 10 and blow mold system 120, according to an exemplary embodiment. As noted above, prior to blow molding, preform 10 is heated such that the material of preform 10 is able to stretch and expand during the blow molding process. The temperature to which preform 10 is heated may be different for different preform materials.

Referring to FIG. 8, after heating, preform 10 is placed in blow mold system 120 such that perform 10 is supported by mold body 122. Ring 84 of preform 10 seats on the outer surface of mold body 122. The portion of preform 10 above ring 84 (e.g., in this embodiment, upper section 72) is located outside of mold body 122, and the portion of preform 10 located below ring 84 is positioned within blow mold cavity 130. As can be seen in FIG. 8, in this position neck 62, including threads 70, and the closed end 64 of preform 10 are located within blow mold cavity 130 with neck 62 generally aligned with lower well 134 along the longitudinal axis of mold body 122.

Referring to FIG. 9, blow mold system 120 includes a stretch rod 148. Prior to and/or during inflation of preform 10, stretch rod 148 is extended through opening 82 at open end 14 and into interior chamber 66 of preform 10. The lower end of stretch rod 148 engages the inner surface of shoulder segment 80 of preform 10, and, as stretch rod 148 extends further into blow mold cavity 130, it pushes and stretches preform 10 in the axial direction causing the elongation of preform sidewall 60.

As shown in FIG. 9, as preform 10 is stretched, lower well 134 receives neck 62 and end section 64 of perform 10. As preform 10 is stretched downwardly from the position shown in FIG. 8 to the position shown in FIG. 9, the inwardly angled upper surface 140 of upper well 132 helps to guide neck 62 of preform 10 into lower well 134. As shown lower well 134 is sized and shaped to receive neck 62 of preform 10. In the embodiment shown, lower well 134 is generally circular in cross-section to receive the generally circular preform 10, and the inner diameter of lower well 134 is slightly greater than the outer diameter of threads 70 of preform 10 such that neck 62 fits securely within lower well 134. In various embodiments, lower well 134 is sized such that the clearance between the outer surface of perform threads 70 and the surface of well 134 is between about $1/10$ inch and $1/20{,}000$ inch, specifically between about $1/100$ inch and $1/10{,}000$ inch, and more specifically between about $1/1000$ inch and $1/10{,}000$ inch. In one embodiment, lower well 134 is sized such that the clearance between the outer surface of perform threads 70 and the surface of well 134 is about $1/10{,}000$ inch. The close fit between threads 70 and lower well 134 acts to resist or prevent deformation of neck 62 and threads 70 that may otherwise occur during blow molding. In other embodiments, lower well 134 may be other non-circular shapes to receive a non-circular shaped preform neck.

Referring to FIG. 10, after preform 10 is stretched, blow mold system 120 creates a pressure differential between the interior of preform 10 and blow mold cavity 130 causing preform 10 to expand into conformance with the inner surface of blow mold cavity 130 to create container body 16. In the exemplary embodiment shown, angled upper surface 140 of upper well 132 creates the angled shoulder of container body 16 adjacent the closed end 18 of container body 16 (which corresponds to neck 62 of preform 10). In one embodiment, expansion is caused by blowing air into perform 10. In some embodiments, the stretching and inflation steps may overlap such that inflation begins before the preform is fully stretched into the position shown in FIG. 9.

As depicted in FIGS. 9 and 10, upper well 132 and lower well 134 have a size and shape selected to receive a preform of a particular size. For example, to secure neck 62 of preform 10, the inner diameter of lower well 134 is selected to be slightly greater than the outer diameter of threads 70 of preform 10, and the angle of upper surface 140 of upper recess 132 is selected to produce a container shoulder of the desired angle. In some embodiments, because blow mold base 124 is a separate, modular component of blow mold system 120, base 124 may be exchanged or switched with another base 124 that includes an upper well 132 and/or lower well 134 having different sizes and/or shapes. This allows one mold body 122 to be used to produce a variety of container bodies 16 having different sized and shaped neck finishes and different sized and shaped shoulders by selecting a base 124 with the desired size and shape of wells 132 and 134.

Producing a tubular container body, such as container body 16 (shown in FIG. 1B), via the multi-step process and apparatus discussed above may provide certain advantages over other methods of forming tubular containers such as the extrusion process noted above. For example, in various embodiments, preform 10 and the resulting container body 16 (and the final container) may be made from an orientable polymer material, such as polypropylene. In such embodiments, the multi-step stretch blow molding process discussed above acts to align the polymer molecules in the direction of the stretch caused by stretch rod 148 and in the direction of expansion caused during blow molding such that the material of the completed blow mold container is bi-axially oriented. In some embodiments, this may result in improved strength of the final container relative to tubular containers made by other processes (e.g., the extrusion method discussed above) while still providing a squeezable container. In addition, in some embodiments, the multi-step stretch blow molding method and apparatus discussed above can be used to produce tubular containers made from a clear, transparent or translucent material. Further, the multi-step stretch blow molding method and apparatus discussed above may be able to produce container bodies at a faster rate and with less wasted material relative to some other processes (e.g., the extrusion method discussed above).

Referring to FIG. 1B, following blow molding of preform 10, container body 16 is trimmed to produce trimmed container body 22 (shown in FIG. 1C). To form dispensing opening 25, end section 64 of closed end 18 is trimmed or cut from container body 16. In one embodiment, base 124 may be equipped with a cutting device, shown as cutting element 135, that cuts end section 64 while container body 16 is located within blow mold cavity 130 and while end section 64 and neck 62 are located within lower well 134 (as shown in FIG. 10) following blow molding. In this embodiment, the secure fit of neck 62 within lower well 134 may act to securely hold neck 62 during trimming within lower well 134.

The cutting device may be any device suitable to trim the material of container body 16. For example, the cutting device may include a mechanical cutting element (e.g., a blade, an edge, a knife, etc.) actuated via mechanical, pneumatic, hydraulic or other means, or the cutting device may be an optical cutting device including an optical cutting element, such as a laser. In one such embodiment, the cutting device may be positioned within base 124 such that the cutting element of the cutting device aligns with the appropriate portion of preform 10. For example, the cutting element of the cutting device may be located at a position along cylindrical shaped sidewall portion 144 of lower well 134 such that the cutting element aligns with the upper edge of end section 64 of preform 10. In this position, the cutting element, when activated, will trim, cut or remove end section 64 from preform 10 creating the dispensing opening. In one embodiment, lower well 134 may include an opening located, for example through concave wall portion 146, that provides for removal of the trimmed end section 64 from the blow mold.

In other embodiments, end section 64 may be trimmed at other stages of the manufacturing process. In one exemplary embodiment, end section 64 may be trimmed following removal of container body 16 from mold body 122 utilizing a device separate from base 124. In other exemplary embodiments, end section 64 of preform 10 may be trimmed prior to blow molding. For example, in some embodiments, end section 64 may be trimmed from preform 10 by a cutting device within injection molding system 100, by a cutting device associated with the tool or device that removes preform 10 from injection molding system 100, or by a separate cutting device following removal of preform 10 from injection molding system 100.

Referring to FIGS. 1B and 1C, in addition to trimming closed end 18 of container body 16, open end 20 is trimmed to create filling end 26 of trimmed container body 22 (shown in FIG. 1C). In one embodiment, open end 20 is trimmed below ring 84 (i.e., such that ring 84 is part of the section removed) following removal of container body 16 from mold body 122. Following removal from mold body 122 and trimming, trimmed container body 22 may be filled with the desired material via filling end 26.

Figure 11:
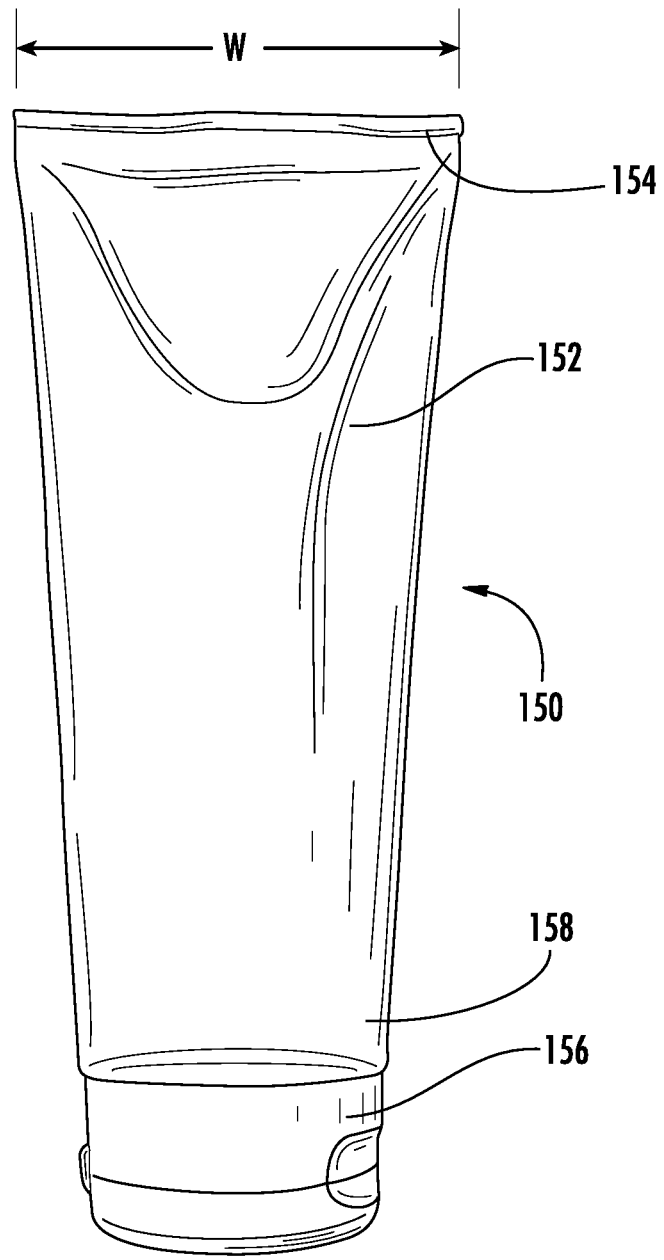
FIG. 11 shows a completed container, according to an exemplary embodiment.

Following filling, filling end 26 is sealed, and a closure or cap is provided on dispensing end 24. Referring to FIG. 11, an unfilled, completed container 150 is shown according to an exemplary embodiment. As shown, container 150 is a squeezable, tubular container produced from preform 10 via the blow molding process and apparatus discussed above. Container 150 includes a sidewall 152, a sealed end 154 and a closure 156. Sealed end 154 is formed from filing end 26 of trimmed container body 22 by pressing together opposing sides of filling end 26. In various embodiments, the opposing sides of filling end 26 may be securely sealed by crimping, welding, thermo-sealing, use of adhesive, and/or other suitable sealing processes. Sidewall 152 includes a lower portion 158 adjacent the upper end of closure 156. As shown, lower portion 158 is substantially round (i.e., has a substantially circular cross-section), and sealed end 154 is substantially flat (i.e., planar). Closure 156 includes internal threads that engage threads 70 on the exterior of the neck of the container to couple closure 156 to the container.

Because the tubular container discussed herein is produced via a blow molding process, the container body 16 may be shaped in a variety of ways by changing the shape of blow mold cavity 130. In one embodiment, container body 16 may be substantially cylindrical. For a container made from a cylindrical container body, the width W of sealed end 154 of the completed container is typically equal to about half of the circumference of sidewall 152 at portion 158 because the sealed end is formed by crimping together opposing sides of the open filling end of the trimmed container. Tubular containers made from an extrusion process typically also have this same relationship between W and the circumference of the sidewall at the opposite end of the container.

In various embodiments, the sidewall of container body 16 may be a non-cylindrical shape. For example, as shown in FIG. 1C, the sidewall of container body 16 may include a slight taper such that the diameter of the container decreases as the distance from closed end 18 increases. For non-cylindrical blow molded tubular containers, as shown in FIG. 11, when the finished container 150 is produced, the width W of sealed end 154 may not equal half of the circumference of sidewall 152 at portion 158 (as is the case with a tubular container formed from a cylindrical tube) for all embodiments. Because it is possible to make various shapes of container body 16 via the process discussed above, the ratio of width W to the circumference of sidewall 152 at portion 158 may be selected as desired to result in a desired shape for container 150 and does not need to be one-half, as is the case for a tubular container formed from a cylindrical tube.

Referring to FIGS. 12-15, squeezable, tubular containers of various non-cylindrical shapes produced via the blow molding processes discussed herein are shown according to various exemplary embodiments. Each of FIGS. 12-15 show an example of a non-cylindrical blow molded container body and the resulting tubular container shape that is produced from the blow molded non-cylindrical container body. Further, the tubular containers shown in FIGS. 12-15 may also include various surface indicia, surface patterns, surface textures, integral lettering/labeling, etc., that are formed during blow molding. Because a blow molding process is used, the tubular containers may be made of varying shapes and with varying surfaces that may not be easily produced using the extrusion process.

Referring to FIGS. 12A-12E, a container body 200, a trimmed container body 210 and a tubular container 212 are shown. Container body 200 is one example of a non-cylindrical shape for a container body which may be produced via a blow molding process. Container body 200 includes a sidewall 202. As shown, container body sidewall 202 includes a convex or outwardly extending section 204 and a concave or inwardly extending portion 206. Further, sidewall 202 may be formed with a surface indicia 208 which may include lettering for various purposes.

Figure 12E:
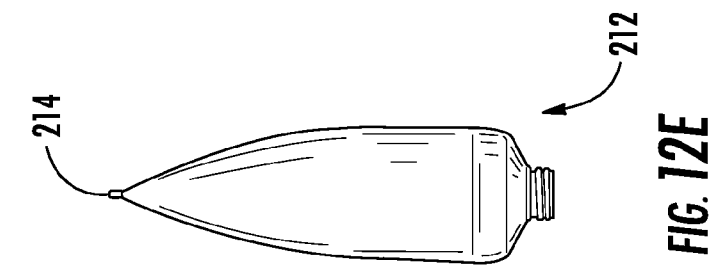
FIGS. 12A-12E show a container body, a trimmed container body and a tubular container according to an exemplary embodiment.
Figure 12D:
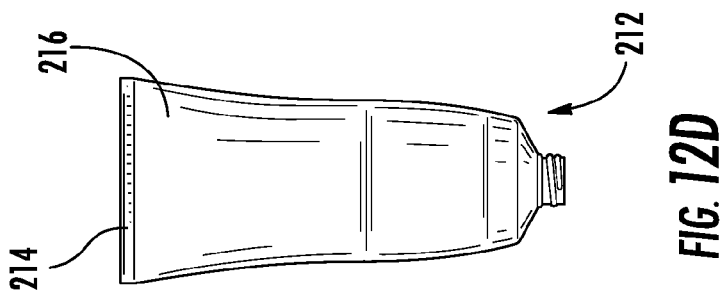
Figure 12C:
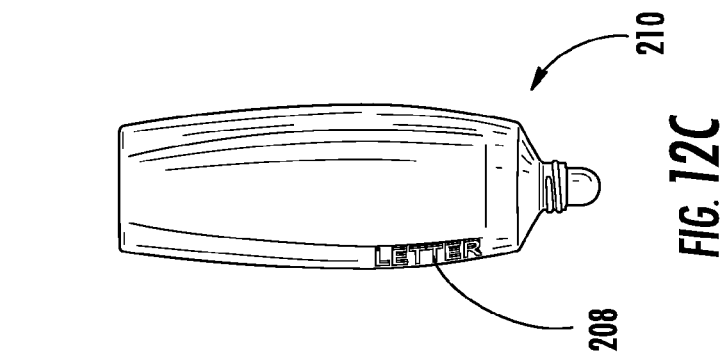
Figure 12B:
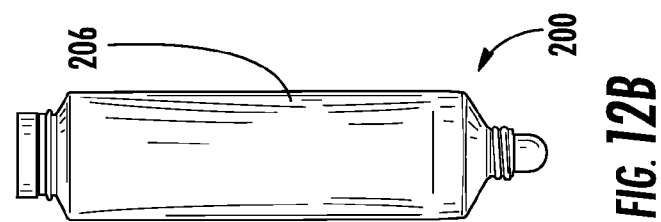
Figure 12A:
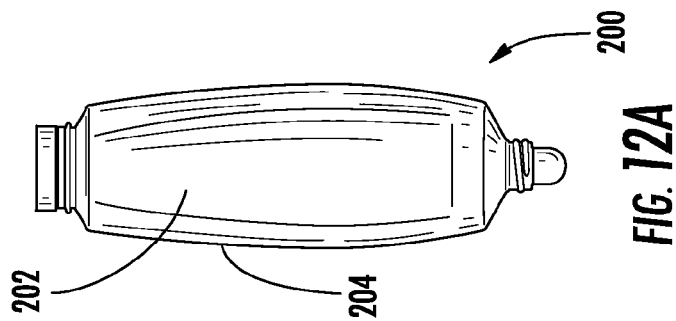

As shown in FIGS. 12D and 12E, tubular container 212 includes a sealed or crimped end 214. The concave and convex portions of sidewall 202 produce a tubular container 212 having the shape generally shown in FIG. 12D following crimping. As shown, tubular container 212 has a flared end 216 adjacent crimped end 214 having a shape which results from the crimping together of the convex-concave sidewall 202.

Referring to FIG. 13A-13E, a container body 300, a trimmed container body 310 and a tubular container 312 are shown. Container body 300 is another example of a non-cylindrical shape for a container body which may be produced via a blow molding process. Container body 300 includes a sidewall 302. As shown, container body sidewall 302 includes a first tapered portion 304 having a cross-sectional area which increases as the distance from the open end of container body 300 increases. Container body sidewall 302 also includes a second tapered portion 306 having a cross-sectional area which increases as the distance to the open end of container body 300 increases. Further, sidewall 302 may be formed with surface texture 308 which may include bumps or ridges to provide a gripping surface.

Tubular container 312 includes a sealed or crimped end 314. The tapered portions of sidewall 302 produce a tubular container 312 having the shape generally shown in FIG. 13D and FIG. 13E following crimping. As shown, tubular container 312 has a rounded, outwardly extending sidewall section 316 which extends from crimped end 314 to the widest section of the container sidewall approximately two thirds along the length of the sidewall. This sidewall shape results from the crimping together of the of sidewall 302 having the two tapered portions shown.

Referring to FIGS. 14A-14E, a container body 400, a trimmed container body 410 and a tubular container 412 are shown. Container body 400 is another example of a non-cylindrical shape for a container body which may be produced via a blow molding process. Container body 400 includes a sidewall 402. As shown, container body sidewall 402 includes a first tapered portion 404 having a cross-sectional area which increases as the distance from the open end of container body 400 increases. Container body sidewall 402 also includes a second tapered portion 406 having a cross-sectional area which increases as the distance to the open end of container body 400 increases. Further, sidewall 402 may be formed with surface texture 408 which may include bumps or ridges to provide a gripping surface. As shown, texture 408 is formed along at least a portion of the tapered sidewall sections 404 and 406.

As shown in FIGS. 14D and 14E, tubular container 412 includes a sealed or crimped end 414. The tapered portions of sidewall 402 produce a tubular container 412 having the shape generally shown in FIG. 14 following crimping. As shown, tubular container 412 has a rounded, outwardly extending sidewall section 416 which extends from crimped end 414 to the widest section of the container sidewall. Tubular container 412 has a second sidewall section 418 which extends from sidewall section 416 to the neck of the container. This sidewall shape results from the crimping together of the of sidewall 402 having the two tapered portions shown. Further, second sidewall section 418 includes one or more stripe surface features 420 which are produced in the surface of the container body during blow molding.

Referring to FIGS. 15A-15E, a container body 500, a trimmed container body 510 and a tubular container 512 are shown. Container body 500 is another example of a non-cylindrical shape for a container body which may be produced via a blow molding process. Container body 500 includes a sidewall 502. As shown, container body sidewall 502 includes a first tapered portion 504 having a cross-sectional area which increases as the distance from the open end of container body 500 increases. Container body sidewall 502 also includes a second tapered portion 506 having a cross-sectional area which increases as the distance to the open end of container body 500 increases. Further, sidewall 502 may be formed with a surface indicia 508 which may be a horizontal or circumferentially located stripe feature. As shown, stripe indicia 508 is located at the widest portion of sidewall 502. Sidewall 502 also includes a triangular or wedge-shaped recess 516 located adjacent the open end of the container body.

Tubular container 512 includes a sealed or crimped end 514. The tapered portions of sidewall 502 and the triangular recess 516 act to produce a tubular container 512 having the shape generally shown in FIG. 15 following crimping. As shown, tubular container 512 has a angled generally triangular shaped sidewall section 518 which extends from crimped end 514 to the widest section of the container sidewall. Tubular container 512 has a second sidewall section 520 which extends from sidewall section 518 to the neck of the container. This sidewall shape results from the crimping together of the of sidewall 502 having the two tapered portions shown and the triangular recess 516.

Figure 16:
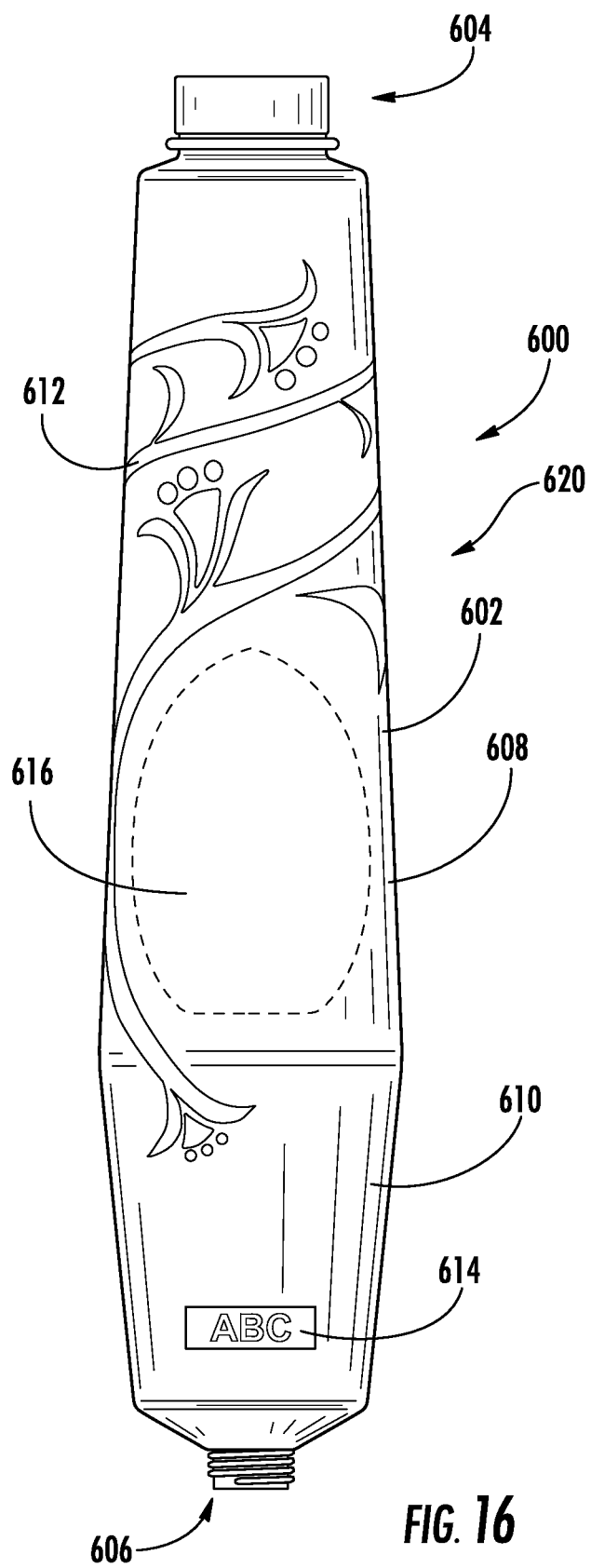
FIG. 16 shows a container body following formation of a dispensing opening according to an exemplary embodiment.

Referring to FIG. 16, a container body 600 is shown according to another exemplary embodiment. Container body 600 includes a sidewall 602, an open end 604, and a dispensing end 606. As shown, open end 604 has not been trimmed, and dispensing end 606 has been trimmed to proving a dispensing opening. As shown, sidewall 602 includes a first tapered portion 608 having a cross-sectional area which increases as the distance from open end 604 increases. Sidewall 602 also includes a second tapered portion 610 having a cross-sectional area which increases as the distance from dispensing end 606 increases. During blow molding, surface indicia, shown as pattern 612, may be formed on sidewall 602. In addition, graphics and/or text, shown as logo 614, may be formed on sidewall 602 during blow molding. As noted above, a label, shown as label 616, may be adhered or printed on to sidewall 602 of container body 600. In the embodiment shown in FIG. 16, pattern 612 and label 616 together form complete label element 620. Because container body 600 is blow molded, complete label element 620 can be formed of both surface indicia formed in the material of sidewall 602 and a separate, subsequently applied label.

Figure 17:
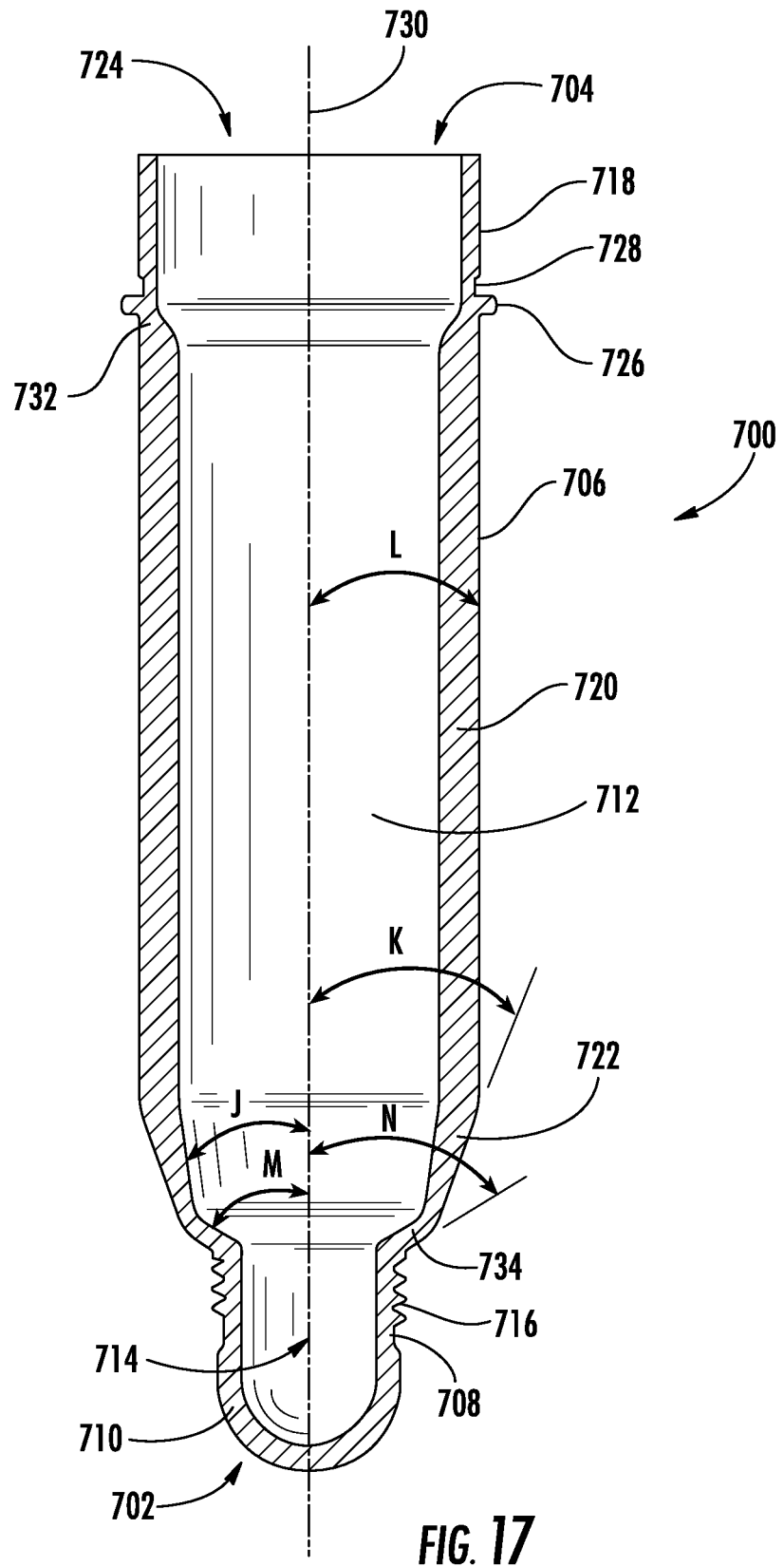
FIG. 17 is a cross-sectional view of a preform according to an exemplary embodiment.

Referring to FIG. 17, a cross-section of preform 700 is shown according to an exemplary embodiment. In one embodiment, preform 700 may be blow molded to form container body 600 shown in FIG. 16. Perform 700 includes a closed end 702 and an open end 704. Perform 10 includes a body sidewall 706 and a neck 708. A generally-domed shaped end section 710 extends from the lower end of neck 708 to form closed end 702. Perform 700 includes an interior chamber 712. Interior chamber 712 terminates at one end in an opening or aperture 714 located through the lower end of neck 708. Aperture 714 becomes the dispensing opening following removal of end section 710. In addition, neck 708 includes a closure engagement structure, shown as threads 716.

Body sidewall 706 of preform 700 includes an upper section 718, a central section 720, and a tapered section 722. Upper section 718 extends generally upward from the upper end of central section 720. As shown in FIG. 17, interior chamber 712 terminates in an opening or aperture 724 defined by the upper edge of upper section 718. Perform 700 includes a rim, bead or ring 726 extending from and generally perpendicular to the outer surface of upper section 718. Preform 700 also includes a circumferential recess 728 formed in the outer surface of upper section 718 above ring 726. In one embodiment, ring 726 and circumferential recess 728 act as a handling feature that may be utilized to hold and manipulate the preform during various stages of processing and manufacturing. In the embodiment shown, the interior surface of upper section 718 defines the maximum internal diameter of interior chamber 712. As shown in the embodiment of FIG. 17, the open, upper section 718 of preform 700 does not include a closure engagement structure (e.g., threads, snap beads, etc.).

Central section 720 extends from the lower end of upper section 718 to the upper end of tapered section 722. As shown in FIG. 17, the inner surface of central section 720 is substantially parallel to the longitudinal axis 730 of preform 700, and the outer surface of central section 720 is slightly angled relative to longitudinal axis 730. Angle L indicates the angle between the outer surface of central section 720 and longitudinal axis 730. In various embodiments, angle L may be between about 0 degrees and 1 degree, specifically between about 0.1 degrees and 0.5 degrees and more specifically between about 0.2 degrees and 0.3 degrees. In one embodiment, angle L may be about 0.25 degrees. In another embodiment, angle L may be 0 degrees such that both the inner and outer surfaces of central section 720 are parallel to longitudinal axis 730, and, in this embodiment, the thickness of central section 720 is substantially constant over the length of central section 720. Central section 720 is thicker than upper section 718 and includes a transition section 732 that increases in thickness joining upper section 718 to central section 720. The thickness of transition section 732 increases as the distance from open end 704 increases providing a transition from the smaller wall thickness of upper section 718 to the larger wall thickness of central section 720.

Tapered section 722 extends from the lower end of central section 720 to the upper end of shoulder section 734. Tapered section 722 is inwardly angled or tapered such that both the inner and outer diameter of preform 700 along tapered section 722 decrease as the distance from open end 704 increases. As such the thickness of sidewall 706 decreases along the length of tapered section 722 as the distances to closed end 702 decreases. As shown, tapered section 722 is positioned at a non-zero angle relative to the central axis 730 of perform 70. Angle J indicates the angle between the inner surface of tapered section 722 and the central axis 730. In various exemplary embodiments, angle J may be between about 0 degrees and about 30 degrees. In particular embodiments, angle J may be between about 1 degree and about 20 degrees, particularly between about 1 degree and about 15 degrees, and more particularly between about 5 degrees and about 10 degrees. In the exemplary embodiment shown in FIG. 17, the angle J is between about 6 degrees and about 10 degrees, specifically is about 8 degrees, and more specifically is about 8 degrees and 17 minutes.

Angle K indicates the angle between the outer surface of tapered section 722 and central axis 730. In various exemplary embodiments, angle K may be between about 0 degrees and about 40 degrees. In particular embodiments, angle K may be between about 1 degree and about 30 degrees, particularly between about 10 degree and about 30 degrees, and more particularly between about 15 degrees and about 25 degrees. In the exemplary embodiment shown in FIG. 17, the angle K is between about 18 degrees and about 22 degrees, specifically is about 20 degrees, and more specifically is about 20 degrees and 9 minutes.

Shoulder section 734 is located between and joins tapered section 722 to neck 708. Shoulder section 734 extends away from the lower end of tapered section 722 and inwardly toward central axis 730. Angle M indicates the angle between the inner surface of shoulder section 734 and the central axis 730, and angle N indicates the angle between the outer surface of shoulder section 734 and the central axis 730. In the exemplary embodiment shown, angle M and angle N are substantially equal to each other such that the wall thickness of shoulder section 734 is constant.

In various exemplary embodiments, angle M and angle N may be between about 10 degrees and about 90 degrees. In particular embodiments, angle M and angle N may be between about 40 degrees and about 80 degrees, particularly between about 45 degrees and about 75 degrees, and more particularly between about 50 degrees and about 70 degrees. In the exemplary embodiment shown in FIG. 17, angle M and angle N are between about 55 degrees and about 65 degrees and more specifically is about 60 degrees.

In various embodiments, central section 720 and tapered section 722 facilitate the formation of the tubular-shaped container of a desired shape during blow molding. In this embodiment, the inward taper and reduction in wall thickness provided by tapered section 722 facilitates the molding of formation of tapered sidewall section 610 of container body 600 shown in FIG. 16. In addition, shoulder section 734 is shaped to facilitate formation the shoulder of container body 600 adjacent dispensing end 606 of container body 600 (shown in FIG. 16).

The figures illustrate the exemplary embodiments in detail, and it should be understood that the present application is not limited to the details or methodology set forth in the description or illustrated in the figures. It should also be understood that the terminology is for the purpose of description only and should not be regarded as limiting.

In various exemplary embodiments, the relative dimensions, including angles, lengths and radii, as shown in the Figures are to scale. Actual measurements of the Figures will disclose relative dimensions, angles and proportions of the various exemplary embodiments. Various exemplary embodiments extend to various ranges around the absolute and relative dimensions, angles and proportions that may be determined from the Figures. Various exemplary embodiments include any combination of one or more relative dimensions or angles that may be determined from the Figures. Further, actual dimensions not expressly set out in this description can be determined by using the ratios of dimensions measured in the Figures in combination with the express dimensions set out in this description.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Any of the features, elements, steps or components of any of the exemplary embodiments discussed above may be used alone or in combination with any of the features, elements, or components of any of the other embodiments discussed above. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A method for forming a container body comprising:
providing a preform having a sidewall, an interior cavity, an open end, a closed end, and a neck adjacent the closed end of the preform, the neck of the preform having a closure engagement structure;
placing at least a portion of the preform into a blow mold cavity of a blow mold system; and
blow molding a container body from the preform by inflating the preform within the blow mold cavity, the container body having an open end, a closed end and a neck adjacent to the closed end, the neck of the container body having a closure engagement structure, wherein the open end of the container body is formed from the open end of the preform, the closed end of the container body is formed from the closed end of the preform and the engagement structure of the container body is formed from the engagement structure of the preform.

2. The method of claim 1 further comprising:
heating the preform prior to blow molding;
stretching the preform within the blow mold cavity; and
creating a dispensing opening through the closed end of the container body;
wherein the portion of the preform placed into the blow mold cavity includes the closed end of the preform and the engagement structure of the preform.

3. The method of claim 2 wherein the preform is stretched via a stretch rod extending through the open end of the preform into the interior cavity of the preform.

4. The method of claim 3 wherein the blow mold system includes a base, the base having a recess and further wherein the closed end of the preform is received within the recess during stretching.

5. The method of claim 4 wherein the blow mold system includes a cutting mechanism configured to create the dispensing opening while the container body is located within the blow mold cavity, wherein the cutting mechanism removes a portion of the closed end from the container body while the closed end of the container body is located within the recess following blow molding of the container body.

6. The method of claim 4 wherein the recess includes a first portion and a second portion, and further wherein a cross-sectional area of the first portion is greater than a cross-sectional area of the second portion, wherein the blow mold system includes a blow mold body which defines at least a portion of the blow mold cavity, wherein the base is separate from the blow mold body.

7. The method of claim 6 further comprising replacing the base with a second base having a second recess, wherein at least one of the size and shape of the second recess is different from the size and the shape of the recess of the first base.

8. The method of claim 1 further comprising cooling the preform and storing the preform prior to blow molding.

9. The method of claim 1 further comprising sealing the open end of the container body to form a sealed end.

10. The method of claim 9 wherein the sealed end is substantially planar and the portion of the container body opposite the sealed end is substantially cylindrical, wherein the container body is made from a polypropylene material, wherein the engagement structure of the container body is threading configured to engage a closure.

\* \* \* \* \*